United States Patent
Kim et al.

(10) Patent No.: US 10,862,106 B2
(45) Date of Patent: Dec. 8, 2020

(54) COMPOSITE POSITIVE ELECTRODE ACTIVE MATERIAL, POSITIVE ELECTRODE INCLUDING THE SAME, AND LITHIUM BATTERY INCLUDING THE POSITIVE ELECTRODE

(71) Applicants: Samsung Electronics Co., Ltd., Suwon-si (KR); Samsung SDI Co., Ltd., Yongin-si (KR)

(72) Inventors: Donghan Kim, Suwon-si (KR); Ryounghee Kim, Yongin-si (KR); Jinhwan Park, Seoul (KR); Jayhyok Song, Yongin-si (KR); Byongyong Yu, Yongin-si (KR); Byungjin Choi, Seoul (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 284 days.

(21) Appl. No.: 15/335,781

(22) Filed: Oct. 27, 2016

(65) Prior Publication Data
US 2017/0125801 A1    May 4, 2017

(30) Foreign Application Priority Data

Oct. 28, 2015 (KR) .................. 10-2015-0150273
Oct. 27, 2016 (KR) .................. 10-2016-0140664

(51) Int. Cl.
*H01M 4/36* (2006.01)
*H01M 10/0525* (2010.01)
(Continued)

(52) U.S. Cl.
CPC .......... *H01M 4/364* (2013.01); *H01M 4/131* (2013.01); *H01M 4/366* (2013.01); *H01M 4/485* (2013.01);
(Continued)

(58) Field of Classification Search
CPC ...... H01M 4/364; H01M 4/366; H01M 4/131; H01M 4/525; H01M 4/485; H01M 4/505; H01M 4/625; H01M 10/0525
See application file for complete search history.

(56) References Cited

U.S. PATENT DOCUMENTS 6,379,842 B1    4/2002 Mayer
6,677,082 B2    1/2004 Thackeray et al.
(Continued)

FOREIGN PATENT DOCUMENTS

CN    101447566 A    6/2009
JP    2001-266879 A    9/2001
(Continued)

OTHER PUBLICATIONS

Shatilo et al. "LiCoO2- and LiMn2O4-Based Composite Cathode Materials", Inorganic Materials, vol. 42, No. 7 (2006), pp. 782-787.*
(Continued)

*Primary Examiner* — Laura Weiner
(74) *Attorney, Agent, or Firm* — Cantor Colburn LLP

(57) ABSTRACT

A composite positive electrode active material includes: a first metal oxide that has a layered structure and is represented by Formula 1; and a second metal oxide that has a spinel structure and is represented by Formula 2, wherein the composite positive electrode active material includes a composite of the first metal oxide and the second metal oxide:

$LiMO_2$    Formula 1

$LiMe_2O_4$    Formula 2 wherein, in Formulas 1 and 2, M and Me are each independently at least one element selected from
(Continued)

Groups 2 to 14 of the periodic table, and a molar ratio of Li/(M+Me) in the composite is less than 1.

17 Claims, 35 Drawing Sheets

(51) Int. Cl.
*H01M 4/131* (2010.01)
*H01M 4/525* (2010.01)
*H01M 4/485* (2010.01)
*H01M 4/505* (2010.01)
*H01M 4/62* (2006.01)

(52) U.S. Cl.
CPC .......... *H01M 4/505* (2013.01); *H01M 4/525* (2013.01); *H01M 4/625* (2013.01); *H01M 10/0525* (2013.01)

(56) References Cited

U.S. PATENT DOCUMENTS

| | | | |
|---|---|---|---|
| 6,680,143 B2 | 1/2004 | Thackeray et al. | |
| 7,205,072 B2 | 4/2007 | Kang et al. | |
| 7,303,840 B2 | 12/2007 | Hackeray et al. | |
| 7,476,467 B2 | 1/2009 | Ark et al. | |
| 7,479,352 B2 | 1/2009 | Yoon et al. | |
| 7,927,506 B2 | 4/2011 | Park | |
| 8,080,340 B2 | 12/2011 | Thackeray et al. | |
| 8,758,942 B2 | 6/2014 | Yoon et al. | |
| 8,852,805 B2 | 10/2014 | Saka et al. | |
| 9,246,162 B2 | 1/2016 | Choi et al. | |
| 9,324,994 B2 | 4/2016 | Oh et al. | |
| 2003/0022063 A1 | 1/2003 | Paulsen et al. | |
| 2003/0047717 A1 | 3/2003 | Kim et al. | |
| 2003/0138699 A1* | 7/2003 | Kweon ................ | H01M 4/364 429/231.95 |
| 2005/0058588 A1 | 3/2005 | Kang et al. | |
| 2006/0147798 A1 | 7/2006 | Lu et al. | |
| 2007/0148546 A1 | 6/2007 | Shimizu et al. | |
| 2009/0087746 A1 | 4/2009 | Kang et al. | |
| 2010/0086853 A1 | 4/2010 | Venkatachalam et al. | |
| 2012/0282521 A1 | 11/2012 | Choi et al. | |
| 2013/0130103 A1 | 5/2013 | Kim et al. | |
| 2013/0149609 A1 | 6/2013 | Deng et al. | |
| 2013/0202953 A1 | 8/2013 | Sharma et al. | |
| 2013/0236795 A1* | 9/2013 | Lee ................ | H01M 10/0567 429/314 |
| 2014/0193714 A1 | 7/2014 | Kim et al. | |
| 2014/0356715 A1 | 12/2014 | Lee et al. | |
| 2015/0180032 A1 | 6/2015 | Thackeray et al. | |
| 2016/0190577 A1* | 6/2016 | Thackeray ............ | H01M 4/485 429/158 |

FOREIGN PATENT DOCUMENTS

| | | |
|---|---|---|
| JP | 5531602 A | 5/2014 |
| JP | 2014-517480 A | 7/2014 |
| KR | 1020060044953 A | 5/2006 |
| KR | 1020080031616 A | 4/2008 |
| KR | 1020080054708 A | 6/2008 |
| KR | 1020080071387 A | 8/2008 |
| KR | 1020090093165 A | 9/2009 |
| KR | 1020110097719 A | 8/2011 |
| KR | 1020120124779 A | 11/2012 |
| KR | 1020130024595 A | 3/2013 |
| KR | 1020130055441 A | 5/2013 |
| KR | 10-1451196 B1 | 10/2014 |
| KR | 10-1470092 B1 | 10/2014 |
| WO | 02073717 A1 | 9/2002 |
| WO | 2011031544 A2 | 3/2011 |
| WO | 2016109499 A1 | 7/2016 |
| WO | 2017032789 A1 | 3/2017 |

OTHER PUBLICATIONS

European Search Report for European Patent Application No. 16196072.9 dated Feb. 1, 2017.

Lee et al., "High-Voltage, High-Energy Layered-Spinel Composite Cathodes with Superior Cycle Life for Lithium-Ion Batteries", Chemistry of Materials, 24, 2014, pp. 600-612.

Long et al, "Advances in Stabilizing 'Layered-Layered' xLi2MnO3. (1-x)LiMO2 (M=Mn, Ni,Co) Electrodes with a Spinel Component", Journal of The Electrochemical Society, 161(14), 2014, A2160-A2167.

Chinese Office Action for Chinese Patent Application No. 201610972528.4 dated Jul. 28, 2020.

Nayak et al., "Electrochemical Performance of a Layered-Spinel Integrated Li[Ni1/3Mn2/3]O2 as a High Capacity Cathode Material for Li-Ion Batteries", Chem.Mater. 27, 2015, pp. 2600-2611.

Summons to Oral Proceedings for European Patent Application No. 16196072.9 dated May 13, 2020.

* cited by examiner

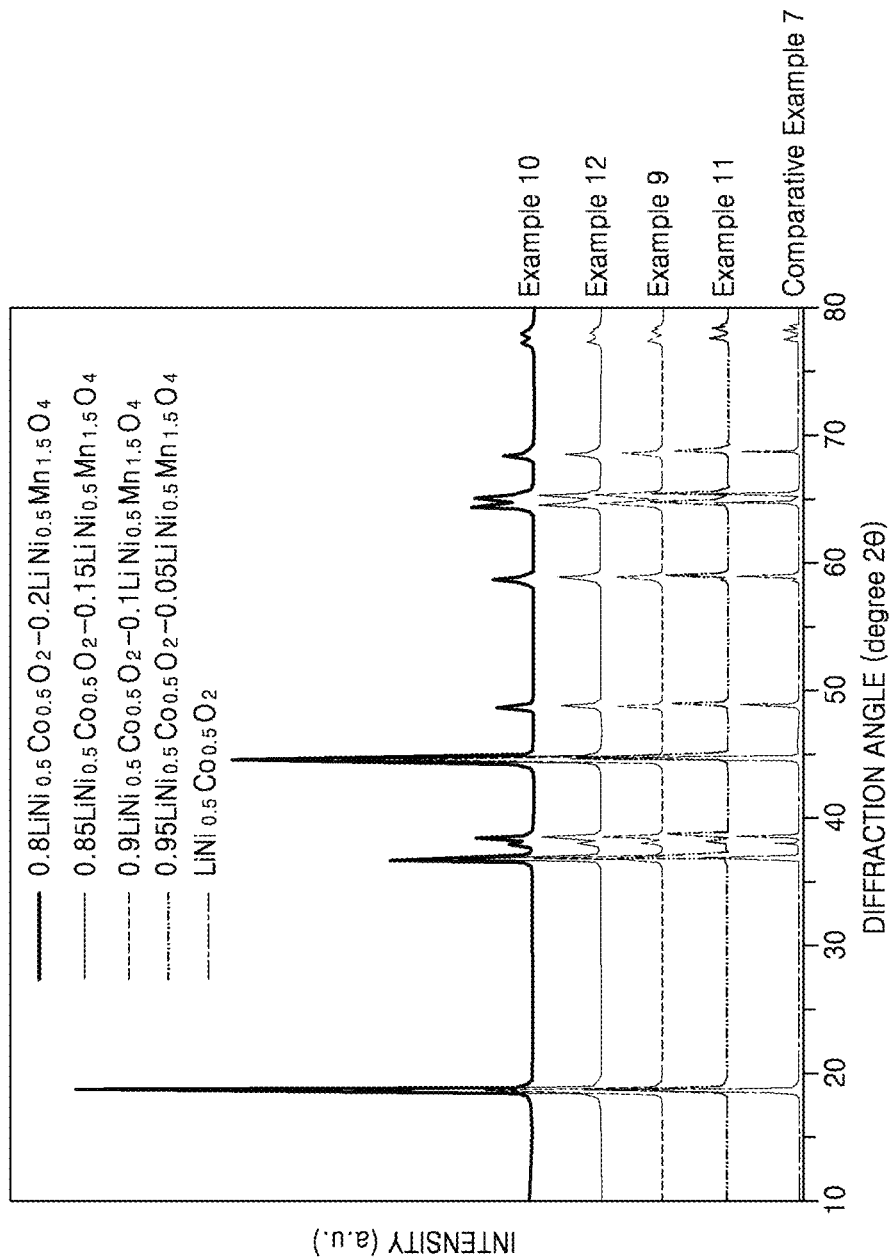

COMPOSITE POSITIVE ELECTRODE ACTIVE MATERIAL, POSITIVE ELECTRODE INCLUDING THE SAME, AND LITHIUM BATTERY INCLUDING THE POSITIVE ELECTRODE

CROSS-REFERENCE TO RELATED APPLICATIONS

This application claims the benefit of and priority to Korean Patent Application No. 10-2015-0150273, filed on Oct. 28, 2015, and Korean Patent Application No. 10-2016-0140664, filed on Oct. 27, 2016, and all the benefits accruing therefrom under 35 U.S.C. § 119, the contents of which are incorporated herein in their entirety by reference.

BACKGROUND

1. Field

The present disclosure relates to a composite positive electrode active material, a positive electrode including the same, and a lithium battery including the positive electrode.

2. Description of the Related Art

Lithium batteries have been recently used as power sources for vehicles, as well as portable electronic devices. Accordingly, many studies to improve the capacity of these batteries have been actively conducted. Also, as the complexity and functionality of many portable electronic devices have increased, demands for small, light, and high-voltage lithium batteries to be used as power sources for such devices have increased.

In order to manufacture a lithium battery that satisfies these demands, a positive electrode active material with excellent lifespan and capacity characteristics is needed in order to prevent discharge voltage decay of the positive electrode active material due to repeated charging and discharging of the lithium battery including the positive electrode active material.

SUMMARY

Provided is a composite positive electrode active material having a stable structure during repeated charging and discharging of a lithium battery including the composite positive electrode active material.

Provided is a positive electrode including the composite positive electrode active material.

Provided is a lithium battery including the positive electrode.

Additional aspects will be set forth in part in the description which follows and, in part, will be apparent from the description, or may be learned by practice of the presented embodiments.

According to an aspect of an embodiment, a composite positive electrode active material includes: a first metal oxide that has a layered structure and is represented by Formula 1; and a second metal oxide that has a spinel structure and is represented by Formula 2, wherein the composite positive electrode active material includes a composite of the first metal oxide and the second metal oxide:

$LiMO_2$     Formula 1

$LiMe_2O_4$     Formula 2 wherein, in Formulas 1 and 2, M and Me are each independently at least one element selected from Groups 2 to 14 of the periodic table, and a molar ratio of Li/(M+Me) in the composite is less than 1.

According to an aspect of another embodiment, a positive electrode includes the composite positive electrode active material.

According to an aspect of another embodiment, a lithium battery includes the positive electrode.

Also disclosed is a method of preparing a composite positive electrode active material including a composite of a first metal oxide having a layered structure and represented by Formula 1 and a second metal oxide having a spinel structure and represented by Formula 2, $LiMO_2$     Formula 1

$LiMe_2O_4$     Formula 2 wherein, in Formulas 1 and 2, M and Me are each independently at least one element selected from Groups 2 to 14 of the periodic table, and a molar ratio of Li/(M+Me) in the composite is less than 1, the method including: contacting at least one metal compound selected from a metal hydroxide represented by Formula 13a, a metal carbonate represented by Formula 13b, and a metal oxalate represented by Formula 13c or Formula 13d and a lithium compound to form a mixture, $M(OH)_2$     Formula 13a wherein, in Formula 13a, M is at least one selected from elements belong to Groups 2 to 14, or, for example, Groups 4 to 10, $MCO_3$     Formula 13b wherein, in Formula 13b, M is at least one selected from elements belong to Groups 2 to 14, or, for example, Groups 4 to 10, $MOC(=O)C(=O)O$     Formula 13c $M(C_2O_4)$     Formula 13d wherein, in Formulas 13c and 13d, M is at least one selected from elements belong to Groups 2 to 14, or, for example, Groups 4 to 10; and heat-treating the mixture at about 400° C. to about 1200° C. to prepare the composite positive electrode active material.

BRIEF DESCRIPTION OF THE DRAWINGS

These and/or other aspects will become apparent and more readily appreciated from the following description of the embodiments, taken in conjunction with the accompanying drawings in which:

FIGS. 3C and 3D are each a graph of intensity (arbitrary units) versus diffraction angle (degrees two-theta) and show the results of X-ray diffraction analysis of composite positive electrode active materials prepared in Examples 9 to 12 and Comparative Example 7;

DETAILED DESCRIPTION

Figure 1A:
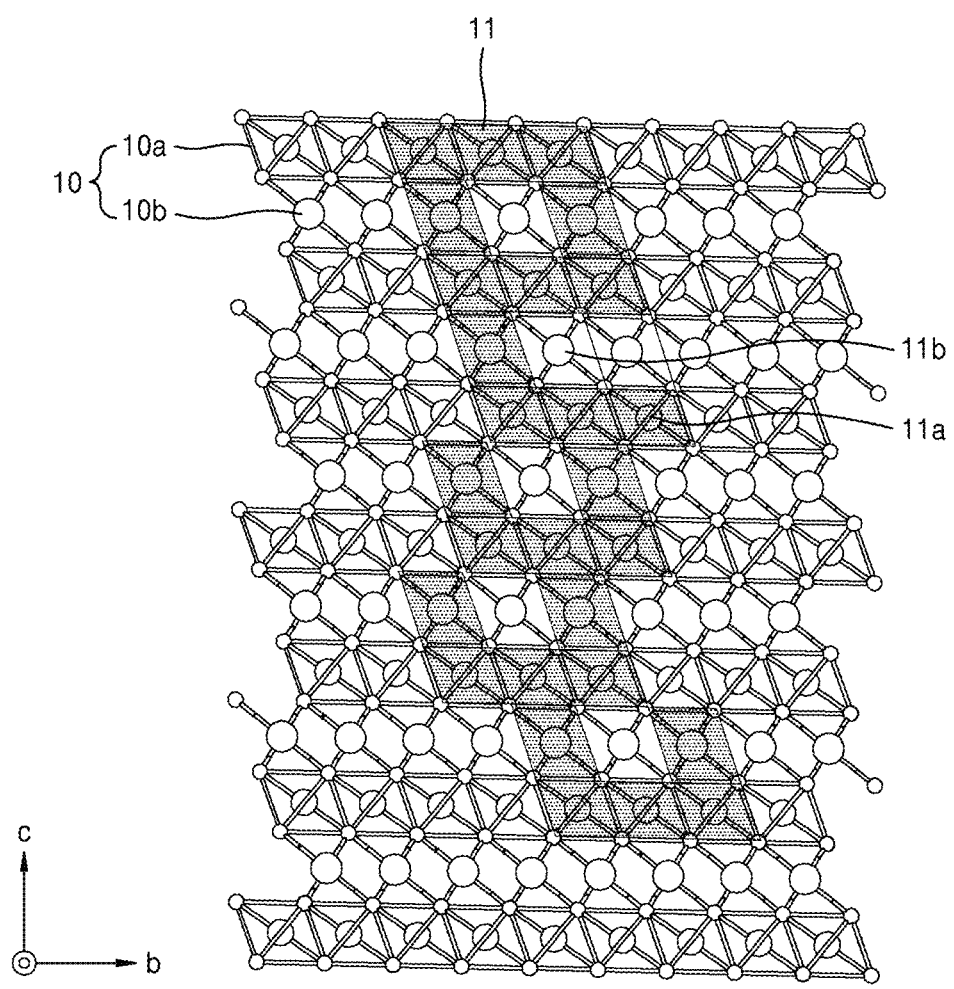
FIG. 1A schematically illustrates a structure and a functional effect of a composite positive electrode active material according to an aspect of an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers or sections, these elements, components, regions, layers, or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Compound" is a substance made from any combination of elements.

"Composite" means a material comprising multiple components. A component may be a compound.

A C rate is a measure of the rate a battery is charged or discharged relative to its maximum capacity. A 1 C rate means a current which will discharge the entire capacity in one hour. Thus, for example, for a battery with a capacity of 100 ampere-hrs, a C rate discharge would be a discharge current of 100 amperes, a 5 C rate for this battery would be 500 amperes, and a C/2 rate would be 50 amperes.

Hereinafter, a composite positive electrode active material, a method of preparing the composite positive electrode active material, a positive electrode including the composite positive electrode active material, and a lithium battery including the positive electrode will be described in further detail by referring to the accompanying drawings.

According to an aspect of an embodiment, a composite positive electrode active material includes a first metal oxide that has a layered structure and is represented by Formula 1; and a second metal oxide that has a spinel structure and is represented by Formula 2, wherein the composite positive electrode active material includes a composite of the first metal oxide and the second metal oxide. The term "spinel structure" means that the compound is iso-structural with spinel, i.e. $MgAl_2O_4$.

     Formula 1

     Formula 2

In Formulas 1 and 2,

M and Me are each independently at least one element selected from Groups 2 to 14 of the periodic table; and a molar ratio of Li/(M+Me) in the composite is less than 1.

For example, in Formula 1, M and Me can each independently be at least one element selected from Groups 4 to 10 of the periodic table, or at least one element selected from Groups 5 to 10 of the periodic table, or at least one element selected from Groups 7 to 10 of the periodic table, at least one element selected from Groups 7, 9, and 10 of the periodic table.

In Formula 1, M and Me can each independently be at least one metal selected from manganese (Mn), vanadium (V), chrome (Cr), iron (Fe), cobalt (Co), nickel (Ni), zirconium (Zr), rhenium (Re), aluminum (Al), boron (B), germanium (Ge), ruthenium (Ru), tin (Sn), titanium (Ti), niobium (Nb), molybdenum (Mo), and platinum (Pt).

The composite positive electrode active material can be represented by Formula 3.

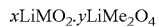     Formula 3

In Formula 3, x and y satisfy x+y=1, 0<x<1, and 0<y<1;

M and Me are each independently at least one element selected from Groups 2 to 14 of the periodic table; and a molar ratio of Li/(M+Me) is less than 1.

In Formula 3, x may be in a range of about 0.75 to about 0.99, or, for example, about 0.85 to about 0.95; and y may be in a range of about 0.01 to about 0.25, or, for example, about 0.05 to about 0.15. When x and y in Formula 3 are within these ranges, the composite positive electrode active material is structurally stable, and a lithium battery including a positive electrode that includes the composite positive electrode active material may have improved lifespan and capacity characteristics.

In Formulas 1 to 3, a molar ratio of Li/(M+Me) is, for example, in a range of about 0.8 to about 0.95, for example, about 0.8 to about 0.9.

In Formulas 1 and 3, M is at least one metal selected from cobalt (Co), manganese (Mn), and nickel (Ni); and, in Formulas 2 and 3, Me is at least one metal selected from manganese (Mn), cobalt (Co), nickel (Ni), and titanium (Ti).

The first metal oxide has a layered structure that, in an embodiment, belongs to the Space Group R-3m, and the second metal oxide has a spinel structure that, in an embodiment, belongs to the Space Group Fd3m.

In some embodiments, the composite positive electrode active material may have an integrated structure, in which the second metal oxide having a spinel phase structure is intermixed into the layered structure of the first metal oxide. In an embodiment, the composite positive electrode active material has crystallographic symmetry and regularity, and the first metal oxide and the second metal oxide may be integrated or intergrown. The crystallographic symmetry and regularity of the composite positive electrode active material may be confirmed by an X-ray diffraction or transmission electron microscope (TEM) analysis. Here, the term "crystallographic symmetry and regularity" refers to a configuration in which symmetry and crystallographic order is maintained throughout the whole composite positive electrode active material, and that the crystalline characteristics are entirely regular and uniform.

In the composite positive electrode active material, a molar ratio of Li/(M+Me) may be obtained by XRD analysis, and the presence of lithium in a tetrahedral site may be evaluated using magic angle spinning (MAS) NMR and confirmed using electron diffraction of the TEM.

The first metal oxide of the formula $LiMO_2$ can be a compound represented by any of Formulas 8 to 10.

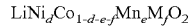     Formula 8

In Formula 8,

0<d<1, 0<e<1, 0≤f<1, and 0<d+e+f<1; and

M is at least one selected from vanadium (V), magnesium (Mg), gallium (Ga), silicon (Si), tungsten (W), molybdenum (Mo), iron (Fe), chrome (Cr), copper (Cu), zinc (Zn), titanium (Ti), aluminum (Al), and boron (B).

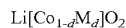     Formula 9

In Formula 9,
$0 \leq d \leq 0.5$; and
M is at least one metal selected from Mg, Al, Ni, Mn, Zn, Fe, Cr, Ga, Mo, and W.

$$\text{Li}[\text{Ni}_{1-d}\text{M}_d]\text{O}_2 \quad \text{Formula 10}$$

In Formula 10,
$0.01 \leq d \leq 0.5$; and
M is at least one metal selected from Mg, Al, Co, Mn, Zn, Fe, Cr, Ga, Mo, and W.

For example, the first metal oxide of the formula $\text{LiMO}_2$ can be $\text{LiCoO}_2$ or $\text{LiNi}_{0.5}\text{Co}_{0.5}\text{O}_2$.

The second metal oxide of the formula $\text{LiMe}_2\text{O}_4$ may be a compounds represented by Formula 11 or 12.

$$\text{Li}(\text{Ni}_{1-b-c}\text{Co}_b\text{Mn}_c)_2\text{O}_4 \quad \text{Formula 11}$$

In Formula 11, $0 \leq b < 0.5$, $0.2 < c \leq 1$, and $b+c=1$.

$$\text{Li}_{1.333}\text{Ti}_{1.667}\text{O}_4 \quad \text{Formula 12}$$

The second metal oxide of the formula $\text{LiMe}_2\text{O}_4$ may be $\text{LiMn}_2\text{O}_4$, $\text{LiNi}_{0.5}\text{Mn}_{1.5}\text{O}_4$, $\text{LiCo}_{0.5}\text{Mn}_{1.5}\text{O}_4$, $\text{Li}_4\text{Mn}_5\text{O}_{12}$ (i.e., $\text{Li}_{1.333}\text{Mn}_{1.667}\text{O}_4$), or $\text{Li}_4\text{Ti}_5\text{O}_{12}$ (i.e., $\text{Li}_{1.333}\text{Ti}_{1.667}\text{O}_4$).

The composite positive electrode active material may be a compound represented by Formula 4 or 5.

$$x\text{LiCoO}_2 \cdot y\text{Li}(\text{Ni}_{1-b-c}\text{Co}_b\text{Mn}_c)_2\text{O}_4 \quad \text{Formula 4}$$

In Formula 4,
$x+y=1$, $0<x<1$, and $0<y<1$; and
$0 \leq b < 0.5$, $0.2 < c \leq 1$, and $b+c=1$.

$$x\text{LiCoO}_2 \cdot y\text{Li}_{1.333}\text{Ti}_{1.667}\text{O}_4 \quad \text{Formula 5}$$

In Formula 5, $x+y=1$, $0<x<1$, and $0<y<1$.

For example, the compound represented by Formula 4 or 5 may be $x\text{LiCoO}_2 \cdot y\text{LiMn}_2\text{O}_4$, $x\text{LiCoO}_2 \cdot y\text{LiNi}_{0.5}\text{Mn}_{1.5}\text{O}_4$, $x\text{LiCoO}_2 \cdot y\text{LiCo}_{0.5}\text{Mn}_{1.5}\text{O}_4$, $x\text{LiCoO}_2 \cdot y\text{Li}_4\text{Mn}_5\text{O}_{12}$, $x\text{LiCoO}_2 \cdot y\text{Li}_{1.33}\text{Mn}_{1.67}\text{O}_4$, or $x\text{LiCoO}_2 \cdot y\text{Li}_4\text{Ti}_5\text{O}_{12}$ ($x\text{LiCoO}_2 \cdot y\text{Li}_{1.33}\text{Ti}_{1.67}\text{O}_4$).

The compound represented by Formula 4 or 5 may be $0.8\text{LiCoO}_2 \cdot 0.2\text{LiMn}_2\text{O}_4$, $0.85\text{LiCoO}_2 \cdot 0.15\text{LiMn}_2\text{O}_4$, $0.9\text{LiCoO}_2 \cdot 0.1\text{LiMn}_2\text{O}_4$, $0.95\text{LiCoO}_2 \cdot 0.05\text{LiMn}_2\text{O}_4$, $0.8\text{LiCoO}_2 \cdot 0.2\text{LiNi}_{0.5}\text{Mn}_{1.5}\text{O}_4$, $0.9\text{LiCoO}_2 \cdot 0.1\text{LiNi}_{0.5}\text{Mn}_{1.5}\text{O}_4$, $0.95\text{LiCoO}_2 \cdot 0.05\text{LiNi}_{0.5}\text{Mn}_{1.5}\text{O}_4$, $0.85\text{LiCoO}_2 \cdot 0.15\text{LiNi}_{0.5}\text{Mn}_{1.5}\text{O}_4$, $0.6\text{LiCoO}_2 \cdot 0.4\text{LiNi}_{0.5}\text{Mn}_{1.5}\text{O}_4$, $0.8\text{LiCoO}_2 \cdot 0.2\text{LiCo}_{0.5}\text{Mn}_{1.5}\text{O}_4$, $0.9\text{LiCoO}_2 \cdot 0.1\text{LiCo}_{0.5}\text{Mn}_{1.5}\text{O}_4$, $0.85\text{LiCoO}_2 \cdot 0.15\text{LiCo}_{0.5}\text{Mn}_{1.5}\text{O}_4$, $0.95\text{LiCoO}_2 \cdot 0.05\text{LiCo}_{0.5}\text{Mn}_{1.5}\text{O}_4$, $0.6\text{LiCoO}_2 \cdot 0.4\text{LiCo}_{0.5}\text{Mn}_{1.5}\text{O}_4$, $0.8\text{LiCoO}_2 \cdot 0.2\text{Li}_4\text{Mn}_5\text{O}_{12}$, $0.8\text{LiCoO}_2 \cdot 0.2\text{Li}_{1.33}\text{Mn}_{1.67}\text{O}_4$, $0.95\text{LiCoO} \cdot 0.05\text{Li}_4\text{Mn}_5\text{O}_{12}$, $0.95\text{LiCoO} \cdot 0.05\text{Li}_{1.33}\text{Mn}_{1.67}\text{O}_4$, $0.6\text{LiCoO}_2 \cdot 0.4\text{Li}_4\text{Mn}_5\text{O}_{12}$, $0.6\text{LiCoO}_2 \cdot 0.4\text{Li}_{1.33}\text{Mn}_{1.67}\text{O}_4$, $0.8\text{LiCoO}_2 \cdot 0.2\text{Li}_4\text{Ti}_5\text{O}_{12}$, $0.8\text{LiCoO}_2 \cdot 0.2\text{Li}_{1.33}\text{Ti}_{1.67}\text{O}_4$, $0.9\text{LiCoO}_2 \cdot 0.1\text{Li}_4\text{Ti}_5\text{O}_{12}$, $0.9\text{LiCoO}_2 \cdot 0.1\text{Li}_{1.33}\text{Ti}_{1.67}\text{O}_4$, $0.95\text{LiCoO}_2 \cdot 0.05\text{Li}_4\text{Ti}_5\text{O}_{12}$, $0.95\text{LiCoO}_2 \cdot 0.05\text{Li}_{1.33}\text{Ti}_{1.67}\text{O}_4$, $0.6\text{LiCoO}_2 \cdot 0.4\text{Li}_4\text{Ti}_5\text{O}_{12}$, $0.6\text{LiCoO}_2 \cdot 0.4\text{Li}_{1.33}\text{Ti}_{1.67}\text{O}_4$, $0.85\text{LiCoO}_2 \cdot 0.15\text{Li}_4\text{Ti}_5\text{O}_{12}$, or $0.85\text{LiCoO}_2 \cdot 0.15\text{Li}_{1.33}\text{Ti}_{1.67}\text{O}_4$.

The composite positive electrode active material may be a compound represented by Formula 6 or 7.

$$x\text{LiNi}_d\text{Co}_{1-d-e}\text{Mn}_e\text{O}_2 \cdot y\text{Li}(\text{Ni}_{1-b-c}\text{Co}_b\text{Mn}_c)_2\text{O}_4 \quad \text{Formula 6}$$

In Formula 6,
$x+y=1$, $0<x<1$, and $0<y<1$; and
$0.5 \leq d < 1$, $0 \leq e < 1$, $0 \leq b < 0.5$, $0.2 < c \leq 1$, and $b+c=1$.

$$x\text{LiNi}_d\text{Co}_{1-d-e}\text{Mn}_e\text{O}_2 \cdot y\text{Li}_{1.333}\text{Ti}_{1.667}\text{O}_4 \quad \text{Formula 7}$$

In Formula 7,
$x+y=1$, $0<x<1$, and $0<y<1$; and
$0.5 \leq d < 1$ and $0 \leq e < 1$.

For example, the compound represented by Formula 6 or 7 may be $0.9\text{LiNi}_{0.5}\text{Co}_{0.5}\text{O}_2 \cdot 0.1\text{LiNi}_{0.5}\text{Mn}_{1.5}\text{O}_4$, $0.8\text{LiNi}_{0.5}\text{Co}_{0.5}\text{O}_2 \cdot 0.2\text{LiNi}_{0.5}\text{Mn}_{1.5}\text{O}_4$, $0.95\text{LiNi}_{0.5}\text{Co}_{0.5}\text{O}_2 \cdot 0.05\text{LiNi}_{0.5}\text{Mn}_{1.5}\text{O}_4$, or $0.85\text{LiNi}_{0.5}\text{Co}_{0.5}\text{O}_2 \cdot 0.15\text{LiNi}_{0.5}\text{Mn}_{1.5}\text{O}_4$.

A lithium transition metal oxide ($\text{LiMO}_2$) having a layered structure forms an ionically bonded crystal structure that is very compact. Oxygen ions with the largest ion radius form a compact layer and lithium ions and transition metal ions are arranged in empty spaces between the oxygen ions, thereby increasing a packing density of the lithium transition metal oxide. A transition metal oxide ($\text{MO}_2$) layer formed of the transition metal ions and the oxygen ions and an oxygen octahedral layer covering the lithium ions are alternatively arranged. Strong ionic bonding is formed within the $\text{MO}_2$ layer, and Coulomb repulsion forces are generated between the $\text{MO}_2$ layer and another $\text{MO}_2$ layer, and thus, intercalation and deintercalation of lithium ions in the $\text{MO}_2$ layer is possible. Also, the lithium ions diffuse along a 2-dimensional plane, and thus, the lithium transition metal oxide has a high ion conductivity.

However, when lithium ions enter into the crystal structure layer during a charging process, the crystals may expand in a direction of a c-axis due to repulsion between oxygen atoms in the $\text{MO}_2$ layer. Also, when the lithium ions escape from the crystal structure, the crystals rapidly contract in a direction of a c-axis and various changes in a phase of the crystals may occur. In this regard, structural stability of the active material may significantly deteriorate.

In order to resolve the deterioration of structural stability, the present inventors provided a positive electrode active material having an integrated structure in which a second metal oxide of the formula $\text{LiMe}_2\text{O}_4$ and having a spinel structure is intermixed into the first metal oxide of the formula $\text{LiMO}_2$ and having a layered structure. The composite positive electrode active material increases the stability of a positive electrode structure during high-voltage charging, and thus lifespan characteristics and voltage characteristics of a lithium battery including the composite positive electrode active material may improve.

FIG. 1A schematically illustrates a structure of a composite positive electrode active material according to an aspect of an embodiment.

Referring to FIG. 1A, the composite positive electrode active material has a structure in which $\text{LiMO}_2$ having a layered structure 10 and $\text{LiMe}_2\text{O}_4$ having a spinel structure 11 of a cubic system are integrated.

As shown in FIG. 1A, the $\text{LiMO}_2$ having a layered structure 10 has a structure including lithium 10b between transition metal layers 10a each formed of a transition metal and oxygen. Also, as shown in FIG. 1A, the $\text{LiMe}_2\text{O}_4$ having a spinel structure 11 has a structure including lithium 11b disposed in a space of a transition metal layer 11a. Therefore, a large amount of the transition metal has a structure in which a phase having a spinel structure 11 is integrated in a layered structure. Here, the spinel structure includes lithium 11b in a space between the transition metal layers 11a.

In an embodiment, transition metal ions of the layered and spinel-structured positive electrode active material occupy all octahedral sites. In a layered structure, six $\text{MO}_6$ octahedra are 2-dimensionally arranged around one $\text{MO}_6$, whereas, in a spinel structure, six $\text{MO}_6$ octahedra are 3-dimensionally arranged around one $\text{MO}_6$. This difference is caused by different oxidation numbers of the transition metal ions. In a compound having the spinel structure, octahedral planes sharing the faces are 3-dimensionally connected and thus provide a moving pathway of the lithium ions during the charging/discharging of the battery.

A structure and a functional effect of the composite positive electrode active material according to an embodiment are as above. However, the functional effect of the composite positive electrode active material is not to be construed as being limited to the description set forth herein, and may be interpreted otherwise without scientific contradiction.

The composite positive electrode active material has an integrated structure in which the second metal oxide having a spinel phase of a cubic system is intermixed into the first metal oxide having a layered structure, and thus when the composite positive electrode active material is delithiated, the active material is structurally stable, compared to structural stabilities of the first metal oxide having a layered structure and the second metal oxide having a spinel structure.

The functional effect of the composite positive electrode active material may be described by applying the integrated structure to a case when an amount of the second metal oxide having a spinel phase in the composite positive electrode active material is relatively large or to a case when a molar ratio of lithium and metal (the total of M and Me) in the composite positive electrode active material of Formula 3 is in a range of higher than or equal to about 0.5 and lower than about 0.9, higher than about 0.5 and lower than about 0.9, or higher than or equal to about 0.6 and lower than about 0.8.

Figure 1B:
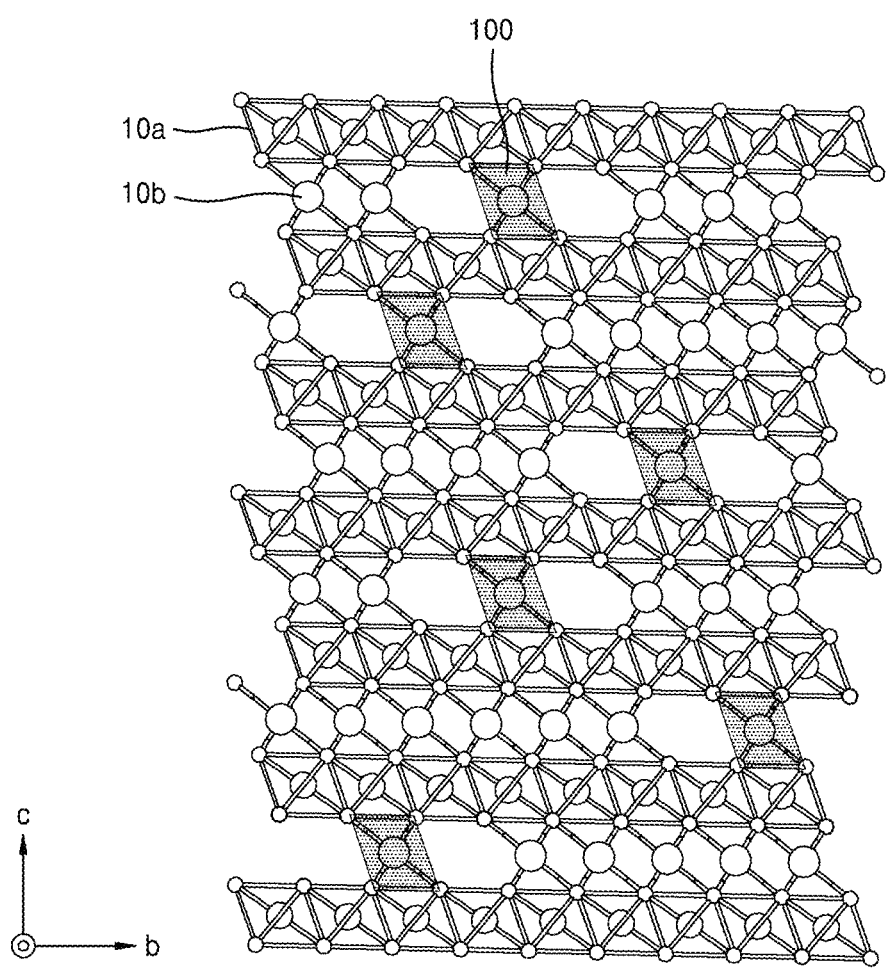
FIG. 1B schematically illustrates a structure and a functional effect of a composite positive electrode active material according to another aspect of an embodiment.

The functional effect of the composite positive electrode active material may be, for example, described by referring to a pillar effect as shown in FIG. 1B. In the case of an embodiment shown in FIG. 1B, the functional effect of the composite positive electrode active material may be described by applying the integrated structure to a case when an amount of the second metal oxide having a spinel structure in the composite positive electrode active material is relatively small, or to a case when a molar ratio of lithium and metal (the total of M and Me) in the composite positive electrode active material of Formula 3 is in a range of about 0.9 to about 0.99.

Referring to FIG. 1B, a lithium layer 10b is between the transition metal layers 10a each formed of oxygen and a transition metal, and the transition metal 100 may be placed as a pillar in the lithium layer 10b, and this may be because of a cationic mixing effect.

Under a delithiation condition, an intensity ratio of a peak corresponding to the (003) face and a peak corresponding to the (104) face, that is, $(I_{003})/(I_{104})$, obtained from X-ray diffraction analysis performed on the composite positive electrode active material, decreases. For example, when an amount of the transition metal on the (003) face of the lithium layer increases, an amount of cations being intermixed increases, and thus $(I_{003})/(I_{104})$ further decreases. In this regard, when the amount of cations being intermixed increases, structural stability of the active material generally deteriorates.

However, when the transition metal exists as a pillar on the (003) face, a structure of the composite positive electrode active material stabilizes in the state of having a high charge under a high-voltage condition. As a result, structural stability of the composite positive electrode active material improves, and thus initial cycle characteristics and lifespan characteristics of a lithium battery including the composite positive electrode active material may improve.

In the compound represented by Formula 3, when Co is introduced as M of $LiMO_2$, a new middle band is formed between a conventional band gap, and thus a band gap energy decreases. Therefore, an electron conductivity of the first metal oxide having a layered structure may improve. Also, the Co-introduced composite positive electrode active material suppresses manganese of the first metal oxide from being partially dissolved in an electrolyte and Jahn Teller distortion, and thus a high-voltage stability of the active material may be improved and deterioration of a discharge capacity may be prevented.

When a charging/discharging test is performed on a half-cell including a positive electrode including a positive electrode active material including the composite positive electrode active material according to an embodiment and lithium as a counter electrode, an average discharge voltage of the half-cell during a $50^{th}$ cycle is about 97.5% to about 99.95%, based on an average discharge voltage during a first cycle. In this regard, it may be confirmed that an average discharge voltage decay in the composite positive electrode active material of Formula 3 is reduced, or an average working voltage retention is improved.

When a charging/discharging test is performed on a half-cell including a positive electrode including the composite positive electrode active material and lithium as a counter electrode, an average discharge voltage of the half-cell during a $50^{th}$ cycle is about 97.5% to about 99.95%, based on an average discharge voltage during a first cycle. In this regard, when the composite positive electrode active material is included in a lithium battery, an effect regarding the average discharge voltage decay of the lithium battery increases.

The composite positive electrode active material may be, for example, a compound represented by Formula 3, in which x is in a range between about 0.85 to about 0.95.

In the composite positive electrode active material, a cation mixing ratio is about 10.0% or less, or, for example, in a range of about 5% to about 10%, or about 6% to about 9%, based on the total amount of lithium sites in the lithium layer. When the composite positive electrode active material has the cation mixing ratio within this range, a crystalline structure of the active material is stabilized even under a high-voltage condition, which prevents the crystalline structure from being destroyed by intercalation and deintercalation of lithium, and thus a lithium battery including the composite positive electrode active material may have improved capacity characteristics and may have improved safety characteristics. When the composite positive electrode active material is used, structural stability of the lithium battery is improved, and thus the lithium battery may have improved lifespan characteristics.

The cation mixing ratio may be obtained by using an intensity ratio of a peak corresponding to the (003) face (where, 2θ is about 18° to about 19°) and a peak corresponding to the (104) face (where, 2θ is about 43° to about 45°) according to Equation 1 below.

$$\text{Cation mixing ratio} = \{I_{(003)}/I_{(104)}\} \times 100 \qquad \text{Equation 1}$$

In Equation 1, $I_{(003)}$ denotes an intensity of the peak corresponding to the (003) face, and $I_{(104)}$ denotes an intensity of the peak corresponding to the (104) face.

The peak corresponding to the (003) face provides information about a layered structure of the composite positive electrode active material, and the peak corresponding to the (104) face provides information about a cubic rock-salt structure of the composite positive electrode active material.

As it may be known from Equation 1, when $I_{(003)}/I_{(104)}$ increases, a cation mixing ratio decreases.

In the X-ray diffraction measurement using Cu-kα radiation performed on the composite positive electrode active material, a full width at half maximum (FWHM) of the peak corresponding to the (003) face (where, 2θ is about 18° to about 19°) is in a range of about 0.2° to about 0.28°. Also, a FWHM of the peak corresponding to the (104) face (where, 2θ is about 43° to about 45°, for example, about 44.5°) is in a range of about 0.25° to about 0.33°.

A composition of the composite positive electrode active material according to an embodiment may be confirmed by the X-ray diffraction analysis.

In the X-ray diffraction measurement using Cu-kα radiation performed on the composite positive electrode active material of Formula 3, a peak corresponding to a (311) face of $LiMe_2O_4$ had a diffraction peak within a 2θ range of about 36° to about 38°. For example, a FWHM of the peak is in a range of about 0.28° to about 0.35°.

An average particle diameter of the composite positive electrode active material may be in a range of about 10 nm to about 500 μm, for example, about 20 nm to about 100 μm, or about 1 μm to about 30 μm. When an average particle diameter of the composite positive electrode active material is within this range, a lithium battery including the composite positive electrode active material may have improved physical properties.

In some embodiments, a tap density of the composite positive electrode active material is in a range of about 0.5 g/cm³ to about 3 g/cm³. When a tap density of the composite positive electrode active material is within this range, a lithium battery including the composite positive electrode active material may have improved voltage characteristics and lifespan characteristics.

A coating layer may be formed on a surface of the composite positive electrode active material. In this regard, when an additional coating layer is formed, a lithium battery including a positive electrode including the composite positive electrode active material may have improved charging/discharging characteristics, lifespan characteristics, and high-voltage characteristics.

In some embodiments, the coating layer may include at least one selected from a conductive material, a metal oxide, and an inorganic fluoride.

The conductive material is at least one selected from a carbon-based material, a conductive polymer, an indium tin oxide (ITO), $RuO_2$, and ZnO.

The carbon-based material may be crystalline carbon, amorphous carbon, or a mixture thereof. Examples of the crystalline carbon may include graphite such as natural graphite or artificial graphite in non-shaped, disk-shaped, flake, spherical, or fibrous form, and examples of the amorphous carbon may include soft carbon (carbon sintered at low temperature), hard carbon, meso-phase pitch carbonization product, sintered cokes, graphene, carbon black, fullerene soot, carbon nanotubes, and carbon fibers. However, examples of the crystalline carbon and the amorphous carbon are not limited thereto, and any suitable material available in the art may be used as the crystalline carbon or the amorphous carbon.

Examples of the carbon-based material may include carbon nanotubes, fullerene, graphene, and carbon fibers. Also, examples of the conductive polymer may include polyaniline, polythiophene, polypyrrole, and a mixture thereof.

The metal oxide may comprise at least one selected from silica ($SiO_2$), alumina ($Al_2O_3$), zirconium oxide ($ZrO_2$), and titanium oxide ($TiO_2$).

The inorganic fluoride may comprise at least one selected from $AlF_3$, CsF, KF, LiF, NaF, RbF, $TiF_4$, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, CeF4, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, and $WF_6$.

In some embodiments, the coating layer may include a coating element compound, such as an oxide of a coating element, a hydroxide of a coating element, an oxyhydroxide of a coating element, an oxycarbonate of a coating element, or a hydroxycarbonate of a coating element. A compound forming the coating layer may be amorphous or crystalline. A coating element included in the coating layer may be at least one selected from Sc, Y, Nb, Cr, Mo, W, Mn, Fe, B, In, C, Sb, La, Ce, Sm, Gd, Mg, Al, Co, K, Na, Ca, Si, Ti, V, Sn, Ge, Ga, B, As, and Zr. A coating layer formation process may be performed by using any suitable method by using these elements to include the compound, as long as the method (for example, a spray coating method or a dipping method) does not negatively affect the physical properties of the positive electrode active material. As such methods are well known to one of ordinary skill in the art, a further description thereof is omitted for clarity.

In some embodiments, the coating layer may be a continuous layer or a discontinuous layer, for example, a layer of an island type.

According to another aspect of an embodiment, a method of preparing a composite positive electrode active material is provided.

A method of preparing a composite positive electrode active material is not particularly limited and may comprise, for example, a co-precipitation method or a solid-phase method.

First, the co-precipitation method will be described hereinafter. When the composite positive electrode active material is prepared using a co-precipitation method, the composite positive electrode active material may have a uniform composition.

A metal compound selected from a metal hydroxide represented by Formula 13a, a metal carbonate represented by Formula 13b, and a metal oxalate represented by Formula 13c or Formula 13d may be mixed with a lithium compound, and the resultant may be heat-treated in air or an oxygen atmosphere at a temperature in a range of about 400° C. to about 1200° C. to obtain a composite positive electrode active material represented by Formula 3.

$M(OH)_2$        Formula 13a

In Formula 13a, M is at least one selected from elements belong to Groups 2 to 14, or, for example, Groups 4 to 10.

$MCO_3$        Formula 13b

In Formula 13b, M is at least one selected from elements belong to Groups 2 to 14, or, for example, Groups 4 to 10.

$MOC(=O)C(=O)O$        Formula 13c $M(C_2O_4)$        Formula 13d

In Formulas 13c and 13d, M is at least one selected from elements belong to Groups 2 to 14, or, for example, Groups 4 to 10.

$xLiMO_2 \cdot yLiMe_2O_4$        Formula 3

In Formula 3, x+y=1, 0<x<1, and 0<y<1;

M and Me are each independently is at least one selected from elements belong to Groups 2 to 14; and a molar ratio of Li/(M+Me) is less than 1.

Among the metal hydroxide represented by Formula 13a, the metal carbonate represented by Formula 13b, and the metal oxalate represented by Formula 13c or Formula 13d, when the metal oxalate is used, stoichiometric amounts of starting materials may each be easily controlled, and thus the composite positive electrode active material having the desired composition may be manufactured.

Examples of the lithium compound may include a lithium carbonate ($Li_2CO_3$), a lithium sulfate ($Li_2SO_4$), a lithium nitrate ($LiNO_3$), and a lithium hydroxide (LiOH). The lithium compound is stoichiometrically mixed with a metal compound represented by one of Formulae 13a to 13d to obtain a composition of the composite positive electrode active material represented by Formula 3.

The heat-treatment is performed in air or an oxygen atmosphere at a temperature in a range of about 400° C. to about 1200° C., for example, at about 900° C. A period of time for performing the heat-treatment may vary depending on the temperature for the heat-treatment. For example, the heat-treatment may be performed for about 5 minutes to about 20 hours.

The compounds represented by Formulae 13a to 13d may be obtained as follows.

An M precursor, a Me precursor, and a solvent are mixed to prepare a precursor mixture. Examples of the solvent may include water and an alcohol-based solvent. The alcohol-based solvent may be a C1 to C4 alcohol, such as ethanol.

A content of the solvent may be about 200 parts to about 3000 parts by weight, based on 100 parts by weight of the total content of the M precursor and Me precursor. When a content of the solvent is within this range, a mixture including the M precursor and Me precursor that are homogenously mixed therein may be obtained. The mixing process of the precursor and the solvent may be performed at a temperature in a range of about 20° C. to about 80° C., for example, at about 65° C.

Examples of the M precursor may include an M carbonate, an M sulfate, an M nitrate, and an M chloride. Also, examples of the Me precursor may be an Me carbonate, an Me sulfate, an Me nitrate, and an Me chloride.

For example, the M precursor may be a cobalt precursor, a manganese precursor, or a nickel precursor. Examples of the cobalt precursor may include a cobalt sulfate, a cobalt nitrate, and a cobalt chloride. Examples of the manganese precursor may include a manganese sulfate, a manganese nitrate, and a manganese chloride. Also, examples of the nickel precursor may include a nickel sulfate, a nickel nitrate, and a nickel chloride.

Examples of the Me precursor may include a manganese precursor, a nickel precursor, and a cobalt precursor. The manganese precursor, the cobalt precursor, and the nickel precursor are as described above.

A chelating agent and a pH adjusting agent are added to the precursor mixture for a co-precipitation reaction to obtain a precipitate. The precipitate thus obtained is filtered and heat-treated. The heat-treatment is performed at a temperature in a range of about 20° C. to about 110° C., for example, at about 80° C. When a temperature of the heat-treatment is within this range, reactivity of the co-precipitation reaction is excellent.

The chelating agent serves to control a reaction rate of forming the precipitate. Examples of the chelating agent may include an ammonium hydroxide ($NH_4OH$) and citric acid. A content of the chelating agent may be determined without undue experimentation.

The pH adjusting agent controls a pH of the reaction mixture to be in a range of 6 to 12, and examples of the pH adjusting agent may include ammonium hydroxide, sodium hydroxide (NaOH), sodium carbonate ($Na_2CO_3$), and sodium oxalate ($Na_2C_2O_4$).

When sodium hydroxide is used as the pH adjusting agent (a precipitating agent), a metal hydroxide represented by Formula 13a is obtained. Also, when sodium carbonate is used as the pH adjusting agent, a metal carbonate represented by Formula 13b is obtained. When sodium oxalate is used as the pH adjusting agent, a metal oxalate represented by Formula 13d is obtained.

For example, a metal compound selected from the metal hydroxide represented by Formula 13a, the metal carbonate represented by Formula 13b, and the metal oxalate represented by Formula 13c or Formula 13d may be represented by Formula 13e.

$$Ni_{1-b-c}Co_bMn_cX \qquad \text{Formula 13e}$$

In Formula 13e,

0≤b<0.5, 0.2<c≤1, and b+c=1; and

X is —OH, —$CO_3$, or —$C_2O_4$.

Hereinafter, a method of preparing the composite positive electrode active material according to an embodiment using a solid-phase method will be described.

The M precursor and the Me precursor are mixed to obtain a precursor mixture.

The mixing process may be performed by performing mechanical mixing using, for example, a ball mill, a Banbury mixer, or a homogenizer. The mechanical mixing may be performed using a zirconia ball.

A period of time for performing the mechanical mixing may vary. For example, the period of time for performing the mechanical mixing may be in a range of about 20 minutes to about 10 hours, for example, 30 minutes to about 3 hours.

An alcohol solvent such as ethanol may be added during the mechanical mixing to increase a mixing efficiency.

A content of the solvent may be in a range of about 100 parts to about 3000 parts by weight, based on 100 parts by weight of the total content of the M precursor and the Me precursor. When a content of the solvent is within this range, the precursors may be homogenously mixed in the mixture.

Examples of the M precursor may include an M hydroxide, an M oxide, and an M carbonate. Also, examples of the Me precursor may be an Me hydroxide, an Me oxide, and an Me carbonate.

Then, the precursor mixture is heat-treated at a temperature in a range of about 400° C. to about 1200° C. The precursor mixture is dried through the heat-treating process.

The resultant thus obtained is mixed with a lithium compound, and then this mixture is heat-treated to obtain the composite positive electrode active material according to an embodiment, for example, the composite positive electrode active material represented by Formula 3. The lithium compound may be the same material as used in the case of using the co-precipitation method. Also, a content of the lithium compound may be controlled to obtain the composition of the composite positive electrode active material represented by Formula 3.

The heat-treatment is performed in air or an oxygen atmosphere at a temperature in a range of, for example, about 650° C. to about 900° C. A period of time for performing the heat-treatment may vary depending on a temperature of the heat-treatment. For example, the heat-treatment may be performed for about 3 hours to about 20 hours.

In some embodiments, the composite positive electrode active material may be prepared by using a preparation method such as a spray pyrolysis method as well as the co-precipitation method or the solid-phase method described above.

According to another aspect of an embodiment, a positive electrode includes the composite positive electrode active material.

According to another aspect of an embodiment, a lithium battery includes the positive electrode.

A positive electrode may be prepared according to the following description.

A positive electrode active material, a binder, and a solvent are mixed to prepare a positive electrode active material composition.

A conducing agent may be further added to the positive electrode active material composition.

A metal current collector may be directly coated with the positive electrode active material composition and dried to prepare a positive electrode plate. Alternatively, the positive electrode active material composition may be cast on a separate support, and then a film detached from the support may be laminated on a metal current collector to prepare a positive electrode.

The positive electrode active material may be a composite positive electrode active material according to an embodiment.

A lithium battery may further include a first positive electrode active material, which is a positive electrode active material generally included in a lithium battery, in addition to the composite positive electrode active material composite.

The first positive electrode active material may be at least one selected from a lithium cobalt oxide, a lithium nickel cobalt manganese oxide, a lithium nickel cobalt aluminum oxide, a lithium iron phosphate, and a lithium manganese oxide, but the first positive electrode active material is not limited thereto, and any suitable positive electrode active material available in the art may be used.

For example, the first positive electrode active material may be a compound that is represented by at least one of the formulas $Li_aA_{1-b}B'_bD_2$ (where, $0.90 \le a \le 1.8$, and $0 \le b \le 0.5$); $Li_aE_{1-b}B'_bO_{2-c}D_c$ (where, $0.90 \le a \le 1.8$, $0 \le b \le 0.5$, and $0 \le c \le 0.05$); $LiE_{2-b}B'_bO_{4-c}D_c$ (where, $0 \le b \le 0.5$, and $0 \le c \le 0.05$); $Li_aNi_{1-b-c}Co_bB'_cD_\alpha$ (where, $0.90 \le a \le 1.8$, $0 \le b \le 0.5$, $0 \le c \le 0.05$, and $0 < \alpha \le 2$); $Li_aNi_{1-b-c}Co_bB'_cO_{2-\alpha}F'_\alpha$ (where, $0.90 \le a \le 1.8$, $0 \le b \le 0.5$, $0 \le c \le 0.05$, and $0 < \alpha < 2$); $Li_aNi_{1-b-c}Mn_bB'_cD_\alpha$ (where, $0.90 \le a \le 1.8$, $0 \le b \le 0.5$, $0 \le c \le 0.05$, and $0 < \alpha \le 2$); $Li_aNi_{1-b-c}Mn_bB'_cO_{2-\alpha}F'_\alpha$ (where, $0.90 \le a \le 1.8$, $0 \le b \le 0.5$, $0 \le c \le 0.05$, and $0 < \alpha < 2$); $Li_aNi_bE_cG_dO_2$ (where, $0.90 \le a \le 1.8$, $0 \le b \le 0.9$, $0 \le c \le 0.5$, and $0.001 \le d \le 0.1$); $Li_aNi_bCo_cMn_dG_eO_2$ (where, $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (where, $0.90 \le a \le 1.8$, and $0.001 \le b \le 0.1$); $Li_aCoG_bO_2$ (where, $0.90 \le a \le 1.8$, and $0.001 \le b \le 0.1$); $Li_aMnG_bO_2$ (where, $0.90 \le a \le 1.8$, and $0.001 \le b \le 0.1$); $Li_aMn_2G_bO_4$ (where, $0.90 \le a \le 1.8$, and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where, $0 \le f \le 2$); $Li_{(3-f)}Fe_2(PO_4)_3$ (where, $0 \le f \le 2$); and $LiFePO_4$.

In these formulas, A is Ni, Co, Mn, or a combination thereof; B' is Al, Ni, Co, Mn, Cr, Fe, Mg, Sr, V, a rare-earth element, or a combination thereof; D is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

Examples of the conducting agent for the cathode active material layer-forming composition may include carbon black, graphite particles, natural graphite, artificial graphite, acetylene black, Ketjen black or carbon fibers; carbon nanotubes, or metal powders, metal fibers or metal tubes of copper, nickel, aluminum, silver, and so on; and conductive polymers such as polyphenylene derivatives. However, the conducting agent is not limited to the examples, and any suitable material can be used as the conducting agent in the related art.

Examples of the binder may include vinylidene fluoride/hexafluoropropylene copolymers, polyvinylidene fluoride, polyimide, polyethylene, polyester, polyacrylonitrile, polymethylmethacrylate, polytetrafluoroethylene (PTFE), carboxymethyl cellulose/styrene-butadiene rubber (CMC/SBR) copolymers, styrene butadiene rubber based polymers, and mixtures thereof.

Examples of the solvent may include N-methylpyrrolidone, acetone, and water. However, the solvent is not limited to the examples, and any suitable solvent can be used as the solvent.

Contents of the composite positive electrode active material, the conducting agent, the binder, and the solvent are as used in the manufacture of a lithium battery. One or more of the conducting agent, the binder, and the solvent may be omitted if desired according to the use and the structure of the lithium battery.

A negative electrode may be obtained in almost the same manner as in the preparation process of the positive electrode, except that the negative electrode active material is used instead of the positive electrode active material.

Examples of the negative electrode active material may include a carbon-based material, silicon, a silicon oxide, a silicon-based alloy, a silicon-carbon composite, tin, a tin-based alloy, a tin-carbon composite, a metal oxide, or a combination thereof.

The carbon-based material may be crystalline carbon, amorphous carbon, or a mixture thereof. Examples of the crystalline carbon may include graphite such as natural graphite or artificial graphitenon-shaped, disk-shaped, flake, spherical, or fibrous form, and examples of the amorphous carbon may include soft carbon (carbon sintered at low temperature), hard carbon, meso-phase pitch carbonization products, sintered cokes, graphene, carbon black, fullerene soot, carbon nanotubes, and carbon fibers. However, examples of the crystalline carbon and the amorphous carbon are not limited thereto, and any suitable material available in the art may be used as the crystalline carbon or the amorphous carbon.

The negative electrode active material may be selected from Si, $SiO_x$ (where, $0 < x < 2$, for example, $0.5 < x < 1.5$), Sn, $SnO_2$, a silicon-containing metal alloy may be at least one selected from Al, Sn, Ag, Fe, Bi, Mg, Zn, In, Ge, Pb, and Ti.

The negative electrode active material may include a metal/semimetal alloyable with lithium, an alloy thereof, or an oxide thereof. For example, the metal/semimetal alloyable with lithium, the alloy thereof, or the oxide thereof may be Si, Sn, Al, Ge, Pb, Bi, Sb, a Si—Y' alloy (where, Y' is an alkali metal, an alkali earth metal, a Group 13 to 16 element, a transition metal, a rare earth element, or a combination thereof except for Si), a Sn—Y' alloy (where Y' is an alkali metal, an alkali earth metal, a Group 13 to 16 element, a transition metal, a rare earth element, or a combination thereof except for Sn), or $MnO_x$ ($0<x\leq2$). Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. Examples of the oxide of the metal/semimetal alloyable with lithium are a lithium titanium oxide, a vanadium oxide, and a lithium vanadium oxide, $SnO_2$, and SiOx (where, $0<x<2$).

For example, the negative electrode active material may include at least one element selected from elements that belong to Groups 13, 14, and 15.

For example, the negative electrode active material may include at least one element selected from Si, Ge, and Sn.

Contents of the negative electrode active material, the conducting agent, the binder, and the solvent are as used in the manufacture of a lithium battery.

A separator is disposed between the positive electrode and the negative electrode. The separator is an insulating thin film having high ion permeability and mechanical strength.

The separator can have a pore diameter of about 0.01 micrometer (μm) to about 10 μm and a thickness of about 5 μm to about 20 μm. The separator may be a sheet or a non-woven fabric including an olefin-based polymer such as polypropylene, or polyethylene, or glass fibers. When a solid polymer electrolyte is used as an electrolyte, the solid polymer electrolyte may also serve as a separator.

Examples of the olefin-based polymer as a material for forming the separator may include polyethylene, polypropylene, polyvinylidene, fluoride, or a multi-layer film having two or more layers including thereof. The separator may be a mixed multi-layer such as a two-layer separator of polyethylene/polypropylene, a three-layer separator of polyethylene/polypropylene/polyethylene, or a three-layer separator of polypropylene/polyethylene/polypropylene.

A lithium salt-containing non-aqueous electrolyte includes a non-aqueous electrolyte and a lithium salt.

Examples of the non-aqueous electrolyte may include a non-aqueous electrolyte solution, an organic solid electrolyte, and an inorganic solid electrolyte.

The non-aqueous electrolyte solution includes an organic solvent. Any suitable organic solvent available in the art may be used as the organic solvent in the non-aqueous electrolyte solution. Examples of the organic solvent may include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, dimethylsulfoxide, dioxane, 1,2-dimethoxyethane, sulfolane, dichloroethane, chlorobenzene, nitrobenzene, diethyleneglycol, dimethylether, and a mixture thereof.

Examples of the organic solid electrolyte may include a polyethylene derivative, a polyethylene oxide derivative, a polypropylene oxide derivative, a phosphate ester polymer, polyester sulfide, polyvinyl alcohol, polyvinylidene fluoride, and a polymer including an ionic dissociation group.

Examples of the inorganic solid electrolyte may include $Li_3N$, LiI, $Li_5NI_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that easily dissolves in the non-aqueous electrolyte, and examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, each of x and y is a natural number), LiCl, LiI, and a mixture thereof. Also, to improve the charging/discharging characteristics and flame retardancy, the non-aqueous electrolyte may further include, for example, pyridine, triethylphosphate, triethanolamine, cyclic ether, ethylenediamine, n-glyme, hexamethyl phosphoramide, a nitrobenzene derivative, sulfur, quinone imine dye, N-substituted oxazolidinone, N,N-substituted imidazolidine, ethyleneglycol dialkylether, ammonium salt, pyrrole, 2-methoxy ethanol, or aluminum trichloride. Optionally, the non-aqueous electrolyte may further include a halogen-containing solvent such as carbon tetrachloride or ethylene trifluoride to provide non-flammability.

Figure 1C:
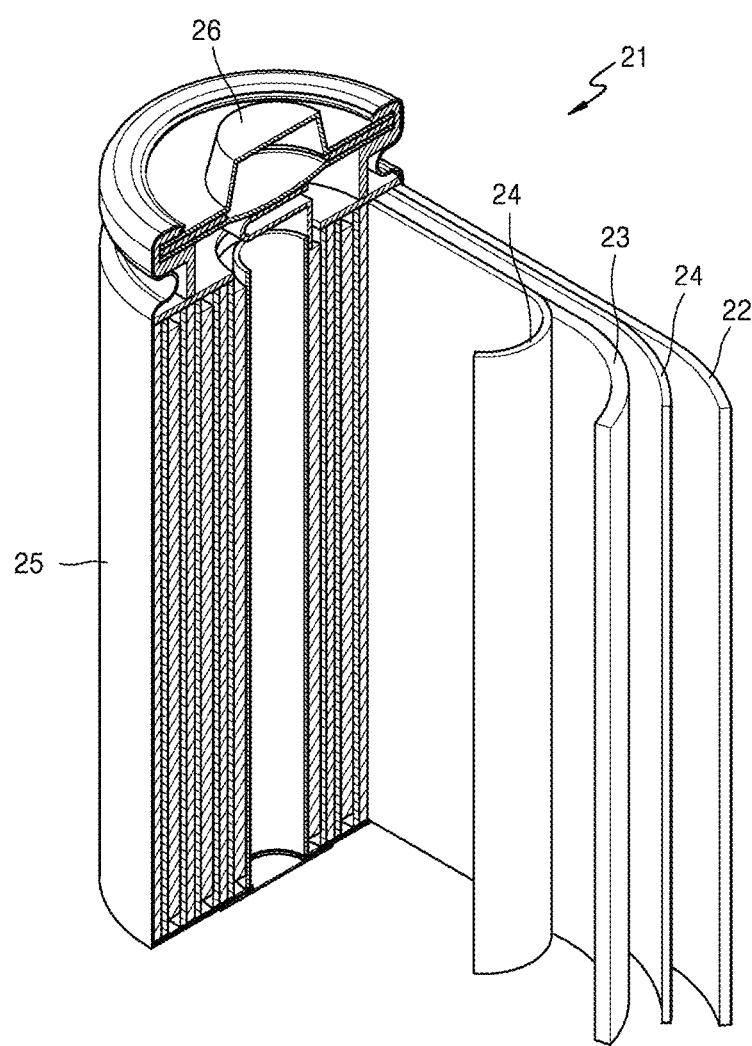
FIG. 1C is an exploded perspective view of a lithium battery according to another embodiment.

As shown in FIG. 1C, a lithium battery 21 includes a positive electrode 23, a negative electrode 22, and a separator 24. The positive electrode 23, the negative electrode 22, and the separator 24 are wound or folded, and then accommodated in a battery case 25. Then, the battery case 25 is filled with an organic electrolyte solution and sealed with a cap assembly 26, thereby completing the manufacture of the lithium battery 21. The battery case 25 may be of a cylindrical type, a rectangular type, or a thin-film type battery case. For example, the lithium battery 21 may be a thin-film type battery. The lithium battery 21 may be a lithium ion battery.

The separator 24 may be disposed between the positive electrode 23 and the negative electrode 22 to form a battery assembly. Alternatively, the battery assembly may be stacked in a bi-cell structure and impregnated with the organic electrolyte solution. The resultant can be disposed in a pouch and sealed, thereby completing the manufacture of a lithium ion polymer battery.

Alternatively, a plurality of battery assemblies may be stacked in series to form a battery pack, which may be used in a device to provide high capacity and high output, for example, in a laptop computer, a smart phone, an electric tool, or in an electric vehicle.

When charging/discharging test results for a half-cell including the positive electrode including a positive electrode active material including the composite positive electrode active material according to an embodiment and lithium as a counter electrode are shown via a graph of differential capacity (dQ/dV, vertical axis) versus voltage (volts versus Li/Li+ (V), horizontal axis) and obtained by differentiating a charging/discharging capacity by the voltage, the composite has redox peaks showing the presence of the appear within a range of about 2 V to about 3 V vs lithium during the charging/discharging of the battery.

A driving voltage of the lithium battery is about 4.5 V or higher. Thus, lifespan and voltage maintaining characteristics of the lithium battery at a high voltage improve. Therefore, the lithium battery may be applicable to an electric vehicle (EV), for example, to a hybrid vehicle such as a plug-in hybrid electric vehicle (PHEV).

Hereinafter, an embodiment will be disclosed in further detail with reference to the following examples. However, these examples are not intended to limit the scope of the disclosed embodiments.

EXAMPLES

Example 1: Preparation of a Composite Positive Electrode Active Material of the Formula $0.9LiCoO_2 \cdot 0.1LiNi_{0.5}Mn_{1.5}O_4$ A composite positive electrode active material was synthesized using a co-precipitation method which will be described hereafter.

Nickel sulfate, cobalt sulfate, and manganese sulfate, as starting materials, were stoichiometrically mixed to obtain the composite positive electrode active material according to the formula $0.9LiCoO_2.0.1LiNi_{0.5}Mn_{1.5}O_4$.

The nickel sulfate, the cobalt sulfate, and the manganese sulfate were dissolved in distilled water at a concentration of 2 molar (M) to obtain a precursor mixture. Sodium oxalate, as a precipitating agent, was added to the precursor mixture, and a co-precipitation reaction in the mixture was allowed at 65° C. for 4 hours to obtain a precipitate $(Ni,Co,Mn)(C_2O_4)_2.2H_2O$.

The precipitate thus obtained was washed with distilled water, dried at 80° C. for 24 hours, and mixed with ethanol and a lithium carbonate ($Li_2CO_3$). Here, the lithium carbonate was stoichiometrically mixed to obtain the composite positive electrode active material of the formula $0.9LiCoO_2.0.1LiNi_{0.5}Mn_{1.5}O_4$.

The mixture was heat-treated in air at 850° C. for 12 hours to obtain the composite positive electrode active material $0.9LiCoO_2.0.1LiNi_{0.5}Mn_{1.5}O_4$.

Example 2: Preparation of a Composite Positive Electrode Active Material $0.95LiCoO_2.0.05LiNi_{0.5}Mn_{1.5}O_4$ A composite positive electrode active material of the formula $0.95LiCoO_2.0.05LiNi_{0.5}Mn_{1.5}O_4$ was obtained in the same manner as in Example 1, except that amounts of nickel sulfate, cobalt sulfate, manganese sulfate, and lithium carbonate, as the starting materials, were changed stoichiometrically to obtain the composite positive electrode active material $0.95LiCoO_2.0.05LiNi_{0.5}Mn_{1.5}O_4$.

Example 3: Preparation of a Composite Positive Electrode Active Material $0.85LiCoO_2.0.15LiNi_{0.5}Mn_{1.5}O_4$ A composite positive electrode active material of the formula $0.85LiCoO_2.0.15LiNi_{0.5}Mn_{1.5}O_4$ was obtained in the same manner as in Example 1, except that amounts of nickel sulfate, cobalt sulfate, manganese sulfate, and lithium carbonate, as the starting materials, were changed stoichiometrically to obtain the composite positive electrode active material $0.85LiCoO_2.0.15LiNi_{0.5}Mn_{1.5}O_4$.

Example 4: Preparation of a Composite Positive Electrode Active Material $0.8LiCoO_2.0.2LiNi_{0.5}Mn_{1.5}O_4$ A composite positive electrode active material of the formula $0.8LiCoO_2.0.2LiNi_{0.5}Mn_{1.5}O_4$ was obtained in the same manner as in Example 1, except that amounts of nickel sulfate, cobalt sulfate, manganese sulfate, and lithium carbonate, as the starting materials, were changed to stoichiometrically to obtain the composite positive electrode active material $0.8LiCoO_2.0.2LiNi_{0.5}Mn_{1.5}O_4$.

Example 5: Preparation of a Composite Positive Electrode Active Material $0.6LiCoO_2.0.4LiNi_{0.5}Mn_{1.5}O_4$ A composite positive electrode active material of the formula $0.6LiCoO_2.0.4LiNi_{0.5}Mn_{1.5}O_4$ was obtained in the same manner as in Example 1, except that amounts of nickel sulfate, cobalt sulfate, manganese sulfate, and lithium carbonate, as the starting materials, were changed stoichiometrically to obtain the composite positive electrode active material $0.6LiCoO_2.0.4LiNi_{0.5}Mn_{1.5}O_4$.

Example 6: Preparation of a Composite Positive Electrode Active Material of the Formula $0.4LiCoO_2.0.6LiNi_{0.5}Mn_{1.5}O_4$ A composite positive electrode active material of the formula $0.4LiCoO_2.0.6LiNi_{0.5}Mn_{1.5}O_4$ was obtained in the same manner as in Example 1, except that amounts of nickel sulfate, cobalt sulfate, manganese sulfate, and lithium carbonate, as the starting materials, were changed stoichiometrically to obtain the composite positive electrode active material $0.4LiCoO_2.0.6LiNi_{0.5}Mn_{1.5}O_4$.

Example 7: Preparation of a Composite Positive Electrode Active Material of the Formula $0.2LiCoO_2.0.8LiNi_{0.5}Mn_{1.5}O_4$ A composite positive electrode active material of the formula $0.2LiCoO_2.0.8LiNi_{0.5}Mn_{1.5}O_4$ was obtained in the same manner as in Example 1, except that amounts of nickel sulfate, cobalt sulfate, manganese sulfate, and lithium carbonate, as the starting materials, were changed stoichiometrically to obtain the composite positive electrode active material $0.2LiCoO_2.0.8LiNi_{0.5}Mn_{1.5}O_4$.

Example 8: Preparation of a Composite Positive Electrode Active Material of the Formula $0.1LiCoO_2.0.9LiNi_{0.5}Mn_{1.5}O_4$ A composite positive electrode active material of the formula $0.1LiCoO_2.0.9LiNi_{0.5}Mn_{1.5}O_4$ was obtained in the same manner as in Example 1, except that amounts of nickel sulfate, cobalt sulfate, manganese sulfate, and lithium carbonate, as the starting materials, were changed stoichiometrically to obtain the composite positive electrode active material of the formula $0.1LiCoO_2.0.9LiNi_{0.5}Mn_{1.5}O_4$.

Example 9: Preparation of a Composite Positive Electrode Active Material of the Formula $0.9LiNi_{0.5}Co_{0.5}O_2.0.1\ LiNi_{0.5}Mn_{1.5}O_4$ A composite positive electrode active material was synthesized by using a co-precipitation method which will be described hereafter.

Nickel sulfate, cobalt sulfate, and manganese sulfate, as starting materials, were stoichiometrically mixed to obtain the composite positive electrode active material of the formula $0.9LiNi_{0.5}Co_{0.5}O_2.0.1LiNi_{0.5}Mn_{1.5}O_4$.

The nickel sulfate, the cobalt sulfate, and the manganese sulfate were dissolved in distilled water at a concentration of 2 M to obtain a precursor mixture. $NH_4OH$, as a chelating agent, and sodium oxalate, as a precipitating agent, were added to the precursor mixture, and a co-precipitation reaction in the mixture was allowed at 65° C. for 4 hours to obtain a precipitate $(Ni,Co,Mn)(C_2O_4)_2.2H_2O$.

The precipitate thus obtained was washed with distilled water, dried at 80° C. for 24 hours, and mixed with ethanol and a lithium carbonate ($Li_2CO_3$). Here, the lithium carbonate was stoichiometrically mixed to obtain the composite positive electrode active material of the formula $0.9LiNi_{0.5}Co_{0.5}O_2.0.1LiNi_{0.5}Mn_{1.5}O_4$.

The mixture was heat-treated in air at 850° C. for 12 hours to obtain the composite positive electrode active material $0.9LiNi_{0.5}Co_{0.5}O_2.0.1LiNi_{0.5}Mn_{1.5}O_4$.

Example 10: Preparation of a Composite Positive Electrode Active Material of the Formula $0.8LiNi_{0.5}Co_{0.5}O_2 \cdot 0.2LiNi_{0.5}Mn_{1.5}O_4$ A composite positive electrode active material of the formula $0.8LiNi_{0.5}Co_{0.5}O_2 \cdot 0.2LiNi_{0.5}Mn_{1.5}O_4$ was obtained in the same manner as in Example 9, except that amounts of nickel sulfate, cobalt sulfate, manganese sulfate, and lithium carbonate, as the starting materials, were changed stoichiometrically to obtain the composite positive electrode active material $0.8LiNi_{0.5}Co_{0.5}O_2 \cdot 0.2LiNi_{0.5}Mn_{1.5}O_4$.

Example 11: Preparation of a Composite Positive Electrode Active Material of the Formula $0.95LiNi_{0.5}Co_{0.5}O_2 \cdot 0.05LiNi_{0.5}Mn_{1.5}O_4$ A composite positive electrode active material of the formula $0.95LiNi_{0.5}Co_{0.5}O_2 \cdot 0.05LiNi_{0.5}Mn_{1.5}O_4$ was obtained in the same manner as in Example 9, except that amounts of nickel sulfate, cobalt sulfate, manganese sulfate, and lithium carbonate, as the starting materials, were changed stoichiometrically to obtain the composite positive electrode active material $0.95LiNi_{0.5}Co_{0.5}O_2 \cdot 0.05LiNi_{0.5}Mn_{1.5}O_4$.

Example 12: Preparation of a Composite Positive Electrode Active Material of the Formula $0.85LiNi_{0.5}Co_{0.5}O_2 \cdot 0.15LiNi_{0.5}Mn_{1.5}O_4$ A composite positive electrode active material of the formula $0.85LiNi_{0.5}Co_{0.5}O_2 \cdot 0.15LiNi_{0.5}Mn_{1.5}O_4$ was obtained in the same manner as in Example 9, except that amounts of nickel sulfate, cobalt sulfate, manganese sulfate, and lithium carbonate, as the starting materials, were changed stoichiometrically to obtain the composite positive electrode active material $0.85LiNi_{0.5}Co_{0.5}O_2 \cdot 0.15LiNi_{0.5}Mn_{1.5}O_4$.

Comparative Example 1: Positive Electrode Active Material of the Formula $LiNiMnO_4$ A positive electrode active material was synthesized by using a co-precipitation method which will be described hereafter.

Nickel sulfate and manganese sulfate, as starting materials, were stoichiometrically mixed to obtain the composite positive electrode active material, $LiNiMnO_4$.

The nickel sulfate and the manganese sulfate were dissolved in distilled water at a concentration of 2 M to obtain a precursor mixture. $NH_4OH$, as a chelating agent, and sodium oxalate, as a precipitating agent, were added to the precursor mixture, and a co-precipitation reaction in the mixture was allowed at 65° C. for 4 hours to obtain a precipitate $(Ni, Mn)(C_2O_4)_2 \cdot 2H_2O$.

The precipitate thus obtained was washed with distilled water, dried at 80° C. for 24 hours, and mixed with ethanol and lithium carbonate ($Li_2CO_3$). Here, the lithium carbonate was stoichiometrically mixed to obtain the positive electrode active material $LiNiMnO_4$.

The mixture was heat-treated in air at 850° C. for 12 hours to obtain the positive electrode active material $LiNiMnO_4$.

Comparative Example 2: Positive Electrode Active Material of the Formula $LiCoO_2$ A positive electrode active material was synthesized by using a co-precipitation method which will be described hereafter.

The cobalt sulfate was dissolved in distilled water at a concentration of 2 M to obtain a precursor mixture. $NH_4OH$, as a chelating agent, and sodium oxalate, as a precipitating agent, were added to the precursor mixture, and a co-precipitation reaction in the mixture was allowed at 65° C. for 4 hours to obtain a precipitate $Co(C_2O_4)_2 \cdot 2H_2O$.

The precipitate thus obtained was washed with distilled water, dried at 80° C. for 24 hours, and mixed with ethanol and lithium carbonate ($Li_2CO_3$). Here, the lithium carbonate was stoichiometrically mixed to obtain the positive electrode active material $LiCoO_2$.

The mixture was heat-treated in air at 850° C. for 12 hours to obtain the positive electrode active material $LiCoO_2$.

Comparative Example 3: Positive Electrode Active Material of the Formula $LiNi_{0.5}Mn_{1.5}O_4$ A positive electrode active material of the formula $LiNi_{0.5}Mn_{1.5}O_4$ was prepared in the same manner as in Comparative Example 1, except that amounts of a nickel sulfate and a manganese sulfate were changed to obtain the positive electrode active material of the formula $LiNi_{0.5}Mn_{1.5}O_4$.

Comparative Example 4: Positive Electrode Active Material of the Formula $LiNi_{0.33}Co_{0.33}Mn_{0.33}O_2$ A positive electrode active material was synthesized by using a co-precipitation method which will be described hereafter.

Nickel sulfate, cobalt sulfate, and manganese sulfate, as starting materials, were stoichiometrically mixed to obtain the positive electrode active material $LiNi_{0.33}Co_{0.33}Mn_{0.33}O_2$.

The nickel sulfate, the cobalt sulfate, and the manganese sulfate were dissolved in distilled water at a concentration of 2 M to obtain a precursor mixture. $NH_4OH$, as a chelating agent, and sodium oxalate, as a precipitating agent, were added to the precursor mixture, and a co-precipitation reaction in the mixture was allowed at 65° C. for 4 hours to obtain a precipitate $(Ni,Co,Mn)(C_2O_4)_2 \cdot 2H_2O$.

The precipitate thus obtained was washed with distilled water, dried at 80° C. for 24 hours, and mixed with ethanol and lithium carbonate ($Li_2CO_3$). Here, the lithium carbonate was stoichiometrically mixed to obtain the composite positive electrode active material $LiNi_{0.33}Co_{0.33}Mn_{0.33}O_2$.

The mixture was heat-treated in air at 850° C. for 12 hours to obtain the positive electrode active material $LiNi_{0.33}Co_{0.33}Mn_{0.33}O_2$.

Comparative Example 5: Positive Electrode Active Material of the Formula $Li_{0.95}CoO_2$ A positive electrode active material of the formula $Li_{0.95}CoO_2$ was prepared in the same manner as in Comparative Example 2, except that an amount of the lithium carbonate mixed with the precipitate was changed stoichiometrically to obtain the positive electrode active material $Li_{0.95}CoO_2$.

Comparative Example 6: Positive Electrode Active Material of the Formula $Li_{0.975}CoO_2$ A positive electrode active material of the formula $Li_{0.975}CoO_2$ was prepared in the same manner as in Comparative Example 2, except that an amount of the lithium carbonate mixed with the precipitate was changed to stoichiometrically to obtain the positive electrode active material $Li_{0.975}CoO_2$.

Comparative Example 7: Positive Electrode Active Material of the Formula $LiNi_{0.5}Co_{0.5}O_2$ A positive electrode active material of the formula $LiNi_{0.5}Co_{0.5}O_2$ was prepared in the same manner as in Comparative Example 1, except that the nickel sulfate and the cobalt sulfate were used instead of nickel sulfate and manganese sulfate and the amounts of the nickel sulfate and cobalt sulfate were changed stoichiometrically to obtain the positive electrode active material $LiNi_{0.5}Co_{0.5}O_2$.

Comparative Example 8: Positive Electrode Active Material Blend of $LiCoO_2$ and $LiNi_{0.5}Mn_{1.5}O_4$ A positive electrode active material blend was prepared by mixing $LiCoO_2$ of Comparative Example 2 and $LiNi_{0.5}Mn_{1.5}O_4$ of Comparative Example 3 at a weight ratio of 9:1.

Example 13: Manufacture of Lithium Battery

The positive electrode active material prepared in Example 1, a carbon conducting material (Denka Black), and polyvinylidene fluoride (PVDF), as a binder, were homogenously mixed in a solvent, N-methyl-2-pyrrolidone (NMP), at a weight ratio of 90:5:5 to prepare a slurry.

An aluminum substrate (thickness: 15 µm) was coated with the slurry using a doctor blade, and the substrate was dried at a reduced pressure at 120° C. and pressed by using a roll-press into a sheet, thereby preparing a positive electrode.

In the preparation of the cell, lithium metal was used as a counter electrode, and an electrolytic solution obtained by dissolving 1.3 M $LiPF_6$ into a mixture of ethylene carbonate (EC), ethylmethyl carbonate (EMC), and diethyl carbonate (DEC) having a volume ratio of 3:5:2 was used as an electrolyte.

Examples 14 to 24: Manufacture of Lithium Batteries

Lithium batteries were manufactured in the same manner as in Example 13, except that the composite positive electrode active materials prepared in Examples 2 to 12 were used, respectively, instead of the composite positive electrode active material prepared in Example 1.

Comparative Examples 9 to 16: Manufacture of Lithium Batteries

Lithium batteries were manufactured in the same manner as in Example 13, except that the positive electrode active materials prepared in Comparative Examples 1 to 8 were used, respectively, instead of the composite positive electrode active material prepared in Example 1.

Evaluation Example 1: X-Ray Diffraction Analysis

1) Examples 1 to 8 and Comparative Examples 2 and 3

X-ray diffraction (XRD) analysis using CuKα radiation was performed on the composite positive electrode active materials prepared in Examples 1 to 8 and the positive electrode active materials prepared in Comparative Examples 2 and 3. The XRD analysis was performed by using a diffractometer (Rigaku RINT2200HF+) using Cu-Kα radiation (1.540598 Å).

Figure 2:
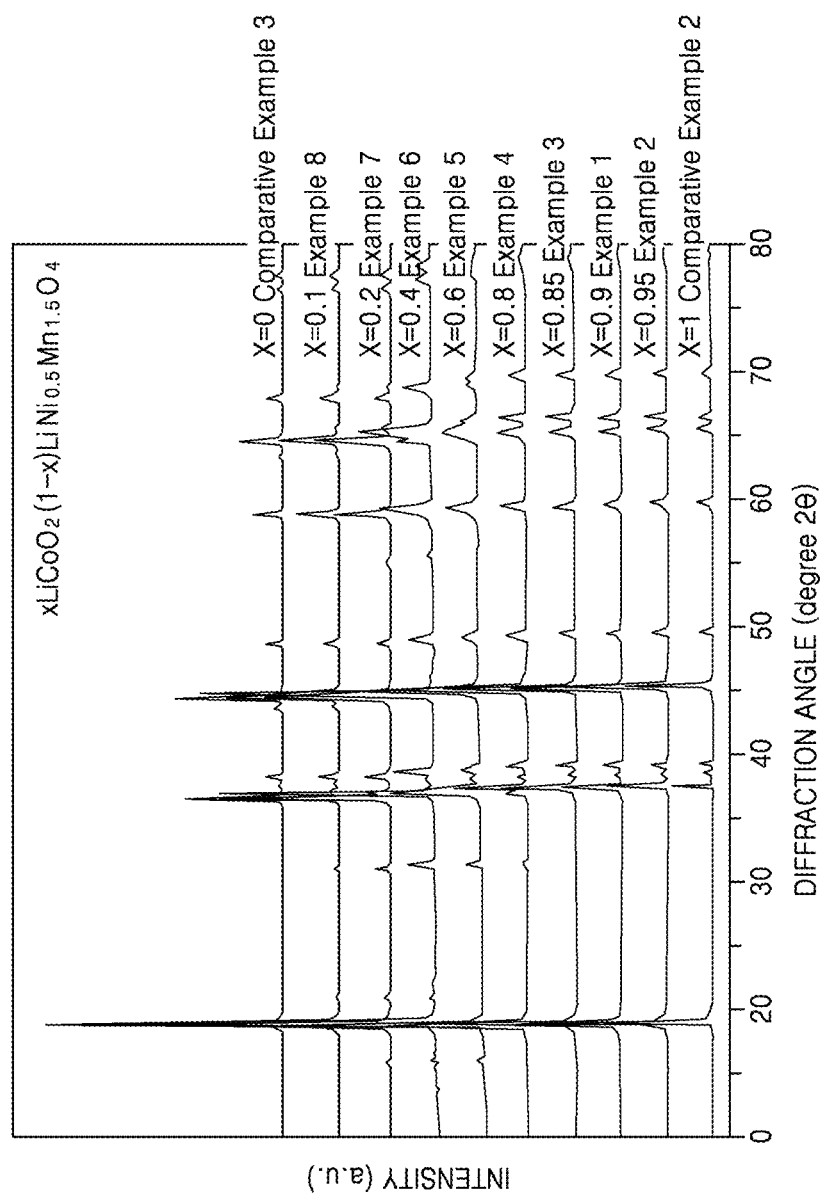
FIGS. 2 and 3A are each a graph of intensity (arbitrary units) versus diffraction angle (degrees two-theta) and show the results of X-ray diffraction analysis of composite positive electrode active materials prepared in Examples 1 to 8 and positive electrode active materials prepared in Comparative Examples 2 and 3.
Figure 3A:
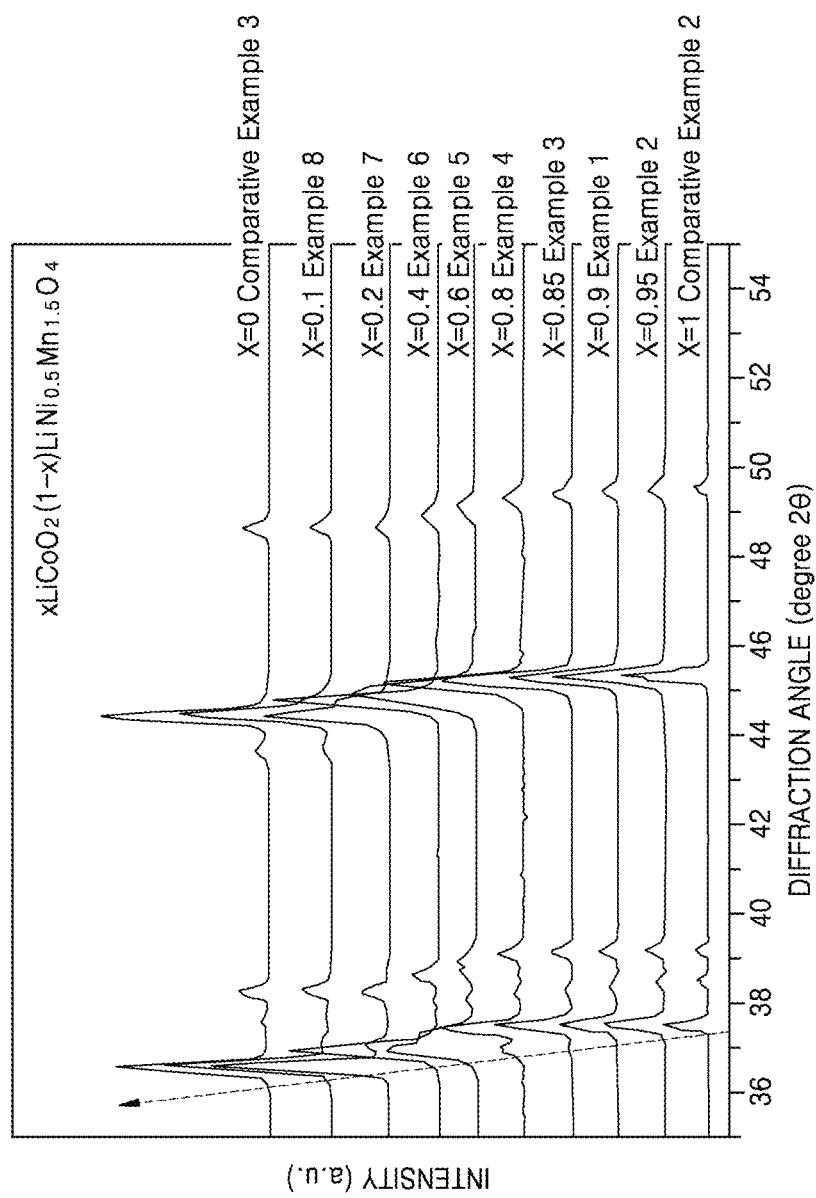

The results of the XRD analysis are shown in FIGS. 2 and 3A.

FIG. 3A is an enlarged view of an area where a diffraction angle 2θ is in a range of about 35° to about 55°. In FIGS. 2 and 3A, each case when x is 0.1, 0.2, 0.4, 0.6, 0.8, 0.85, 0.9, 0.95, or 1 corresponds to Comparative Example 3, Example 8, Example 7, Example 6, Example 5, Example 4, Example 3, Example 1, Example 2, or Comparative Example 2, respectively.

Referring to FIGS. 2 and 3A, when a molar fraction of $LiNi_{0.5}Mn_{1.5}O_4$ being mixed into $LiCoO_2$ increased, an intensity of the peak corresponding to the (311) face, which is characteristic of a spinel phase, within a 2θ range of about 36° to about 38° increased. In this regard, the composite positive electrode active materials according to Examples 1 to 8 have a composite structure of a layered structure and a spinel structure. Also, the composite positive electrode active materials prepared in Examples 1 to 8 had the peak corresponding to the (311) face of $LiNi_{0.5}Mn_{1.5}O_4$ (having a spinel structure) which appeared at a different location compared to that of a spinel phase.

Further, the following characteristics were evaluated using the results of the X-ray diffraction analysis of FIGS. 2 and 3A and are shown in Table 1.

(1) FWHM(104)

FWHM(104) denotes a width (FWHM) at the ½ height of an intensity of the peak corresponding to the (104) face (where 2θ is about 44.5°).

(2) FWHM(311)

FWHM(311) denotes a width (FWHM) at the ½ height of an intensity of the peak corresponding to the (311) face (where 2θ is in a range of about 36° to about) 38°. The peak corresponding to the (311) face provides information about a spinel phase, which is a cubic system.

(3) FWHM(003)

FWHM(003) denotes a width (FWHM) at the ½ height of an intensity of the peak corresponding to the (003) face (where 2θ is in a range of about 18° to about) 19°.

TABLE 1

|  | FWHM (104) | FWHM (311) | FWHM (003) |
|---|---|---|---|
| Example 1 $0.9LiCoO_2 \cdot 0.1LiNi_{0.5}Mn_{1.5}O_4$ | 0.22 | — | 0.2 |
| Example 2 $0.95LiCoO_2 \cdot 0.05LiNi_{0.5}Mn_{1.5}O_4$ | 0.26 | 0.3 | 0.24 |

2) Example 1 and Comparative Examples 2 to 6

XRD analysis using CuKα was performed on the composite positive electrode active material prepared in Example 1 and Comparative Examples 2 to 6. The XRD analysis was performed by using a diffractometer (Rigaku RINT2200HF+) using Cu-Kα radiation (1.540598 Å).

Figure 3B:
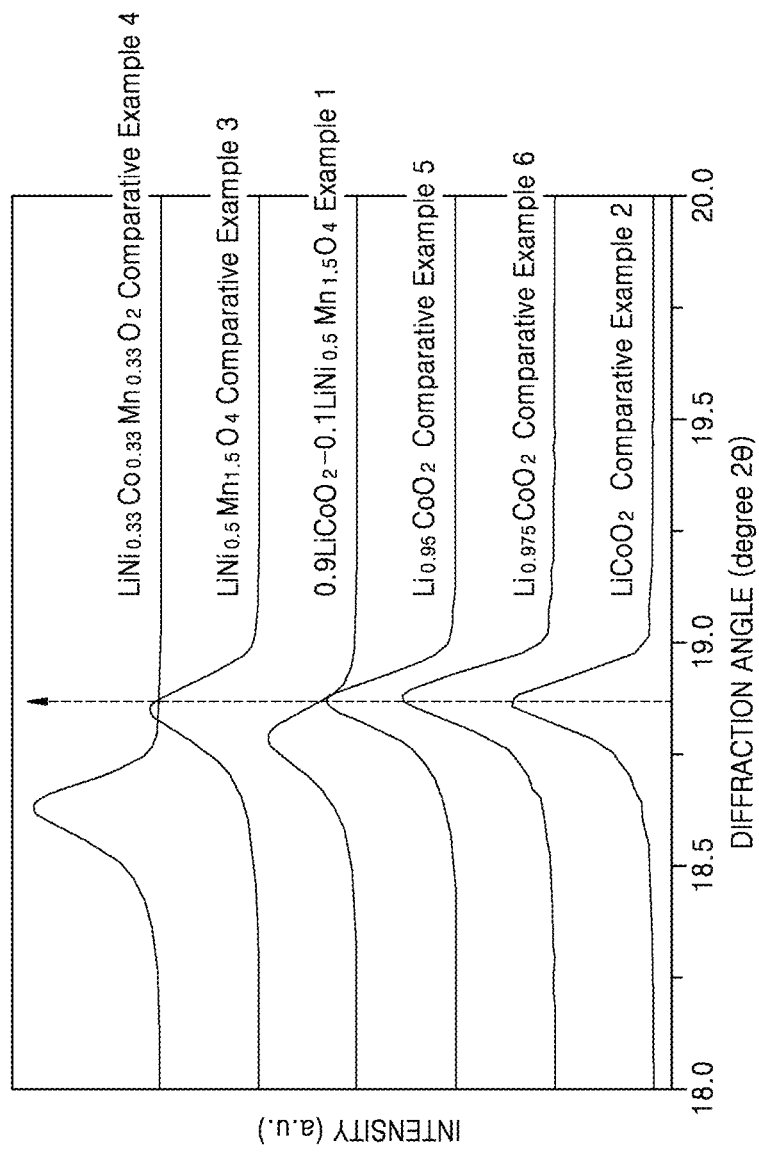
FIG. 3B is a graph of intensity (arbitrary units) versus diffraction angle (degrees two-theta) and shows the results of X-ray diffraction analysis of composite positive electrode active materials prepared in Example 1 and Comparative Examples 2 to 6.

The results of the X-ray analysis are as shown in FIG. 3B. Results illustrated from the top to the bottom of FIG. 3B each represent the results correspond to Comparative Example 4, Comparative Example 3, Example 1, Comparative Example 5, Comparative Example 6, or Comparative Example 2, respectively.

In this regard, it may be determined that the composite positive electrode active material prepared in Example 1 had the peak corresponding to the (003) face located at a lower angle and had a wider FWHM compared to those of the positive electrode active materials prepared in Comparative Examples 2 to 6. Thus, it may be determined that the composite positive electrode active material prepared in Example 1 had less crystallinity and primary particles having a smaller size than it the Comparative Examples.

3) Examples 9 to 12 and Comparative Example 7

XRD analysis using CuKα was performed on the composite positive electrode active material prepared in Examples 9 to 12 and the positive electrode active material prepared Comparative Example 3. The XRD analysis was performed by using a diffractometer (Rigaku RINT2200HF+) using Cu-Kα radiation (1.540598 Å).

Figure 3D:
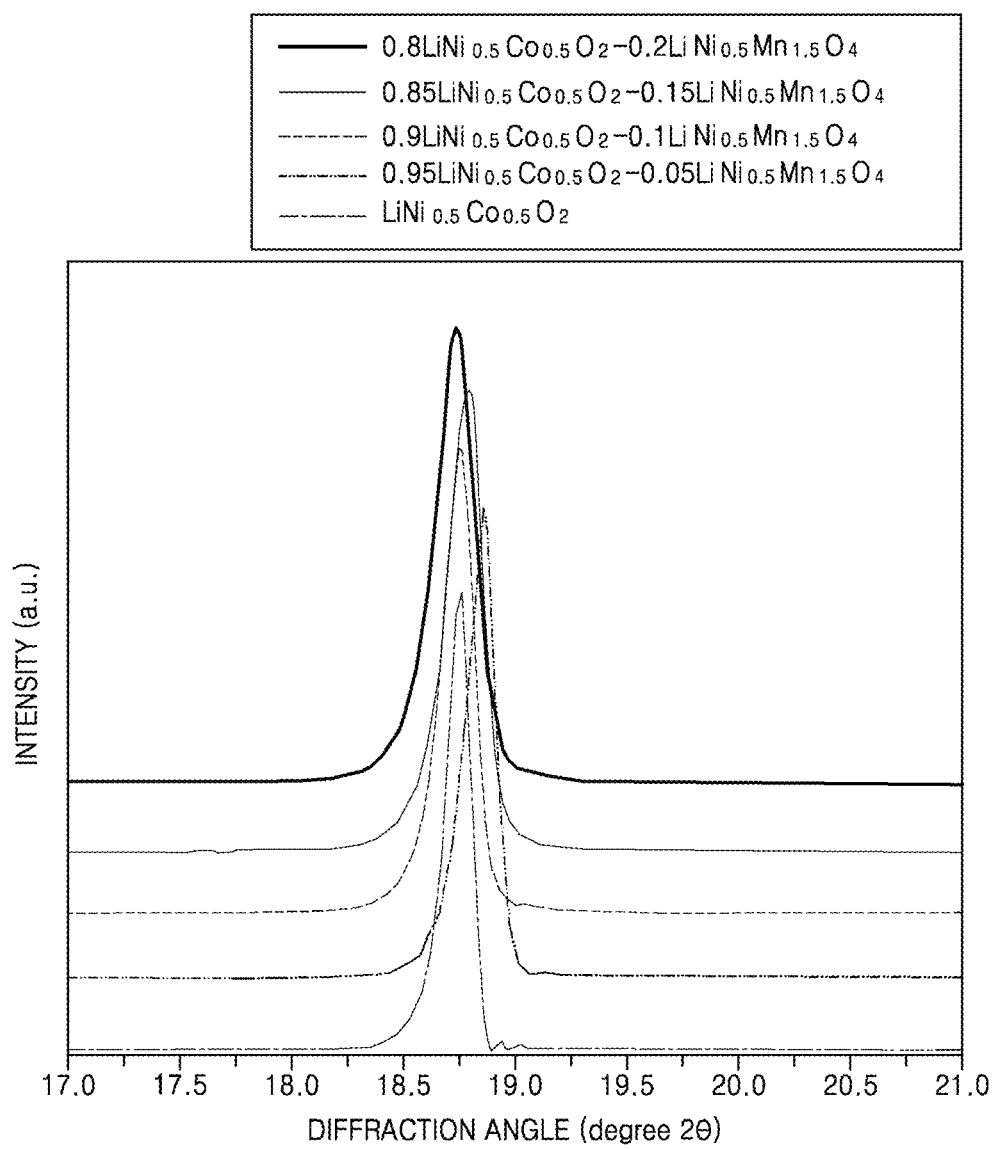

The results of the XRD analysis are shown in FIGS. 3C and 3D. Results illustrated from the top to the bottom of FIG. 3C each represent the results correspond to Example 10, Example 12, Example 9, Example 11, or Comparative Example 7, respectively. Also, the FWHM of the peak corresponding to the (003) face of the composite positive electrode active materials prepared in Examples 9, 10, 11, and 12 are as shown in Table 2.

TABLE 2

| | FWHM (003)(°) |
|---|---|
| Example 9 | 0.25 |
| $0.9LiNi_{0.5}Co_{0.5}O_2 \cdot 0.1LiNi_{0.5}Mn_{1.5}O_4$ | |
| Example 10 | 0.28 |
| $0.8LiNi_{0.5}Co_{0.5}O_2 \cdot 0.2LiNi_{0.5}Mn_{1.5}O_4$ | |
| Example 11 | 0.22 |
| $0.95LiNi_{0.5}Co_{0.5}O_2 \cdot 0.05LiNi_{0.5}Mn_{1.5}O_4$ | |
| Example 12 | 0.27 |
| $0.85LiNi_{0.5}Co_{0.5}O_2 \cdot 0.15LiNi_{0.5}Mn_{1.5}O_4$ | |

Referring to Table 2, it may be determined that the peak corresponding to the (003) face is located at a lower angle and has a wider FWHM compared to those of lithium cobalt oxide (LCO) when an amount of $LiNi_{0.5}Co_{0.5}O_2$ having a spinel phase that is intermixed with LCO having a layered structure increases. In this regard, it may be determined that the composite positive electrode active materials prepared in Examples 9 to 12 had lower crystallinity and primary particles having a smaller size than in the Comparative Examples.

Evaluation Example 2: Charging/Discharging Characteristics

1) Example 13 and Comparative Example 10

Charging/discharging cycles were performed on the lithium batteries prepared in Example 13 and Comparative Example 10 at 25° C.

In the first cycle, the lithium batteries of Example 13 and Comparative Example 10 were each charged at a constant current of 0.1 C until a voltage of the battery reached 4.5 V and then cut-off at a current level at about a rate of 0.01 C while maintaining a constant voltage of about 4.5V. Thereafter, the lithium batteries were discharged at a constant current of 0.2 C until a voltage of the battery reached 2.8 V.

From the second cycle, the lithium batteries of Example 13 and Comparative Example 10 were each charged at a constant current of 0.5 C until a voltage of the battery was 4.5 V and then cut-off at a current level at about a rate of 0.1 C while maintaining a constant voltage of about 4.5V. Thereafter, the lithium batteries were discharged, at a constant current of 1 C until a voltage of the battery was 72.8 V. The charging and discharging process was repeated until the 31$^{th}$ cycle. The number of the charging/discharging cycles performed on each of the lithium batteries of Example 13 and Comparative Example 10 was 35.

Figure 4A:
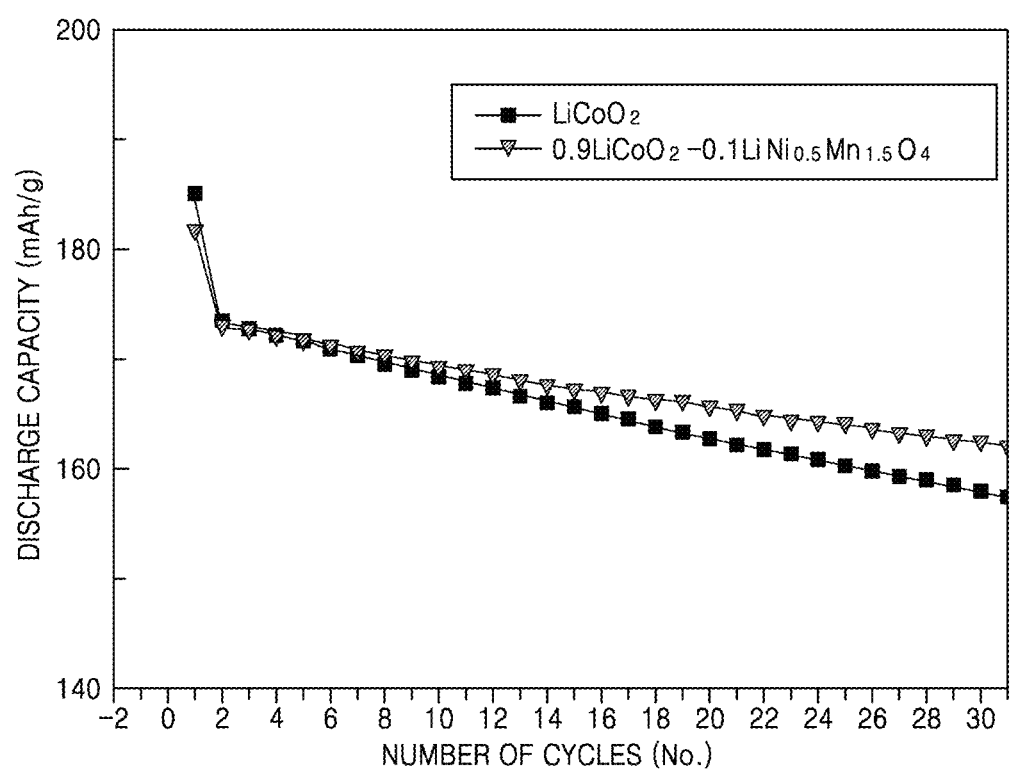
FIG. 4A is a graph of discharge capacity (milliampere-hours per gram, mAh/g) versus number of cycles and shows a change in discharge capacity for lithium batteries prepared in Example 13 and Comparative Example 10.
Figure 4B:
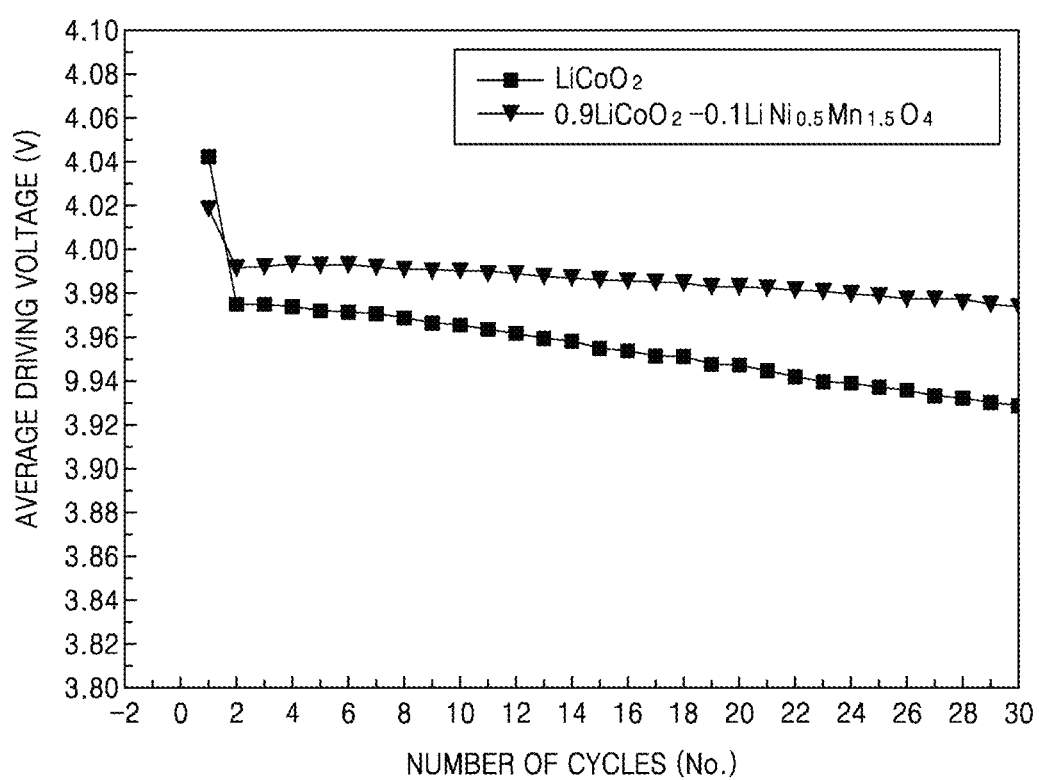
FIG. 4B is a graph of average voltage (volts) versus number of cycles and shows a change in average discharge voltage according to the number of cycles for lithium batteries prepared in Example 13 and Comparative Example 10.

A capacity change according to the number of cycles in each of the lithium batteries of Example 13 and Comparative Example 10 is shown in FIG. 4A, and an average discharge voltage change according to the number of cycles is shown in FIG. 4B. A discharge voltage drop and capacity retention were evaluated by using the capacity change and the average discharge voltage change. In FIGS. 4A and 4B, $LiCoO_2$ corresponds to Comparative Example 10, and $0.9LiCoO_2$-$0.1LiNi_{0.5}Mn_{1.5}O_4$ corresponds to Example 13.

Discharge voltage decay (average working voltage retention)[mV]=[average discharge voltage during 30th cycle−average discharge voltage during 1st cycle]    Equation 2

An average discharge voltage is a discharge voltage corresponding to one-half of a discharge capacity in each cycle.

Capacity retention [%]=[discharge capacity during 30th cycle/discharge capacity during 1st cycle]× 100%    Equation 3

In this regard, the lithium battery prepared in Example 13 had improved initial charging/discharging efficiency compared to that of the lithium battery prepared in Comparative Example 10. Also, it may be determined that the lithium battery of Example 13 had decreased discharge voltage decay (average working voltage retention) and improved capacity retention compared to those of the lithium battery of Comparative Example 10.

2) Examples 21 to 24 and Comparative Example 15

First and second charging/discharging and cycle charging/discharging were performed on the lithium batteries prepared in Examples 21 to 24 and Comparative Example 15 at 25° C.

In the first cycle, the lithium batteries of Examples 21-24 and Comparative Example 15 were each charged at a constant current of 0.1 C until a voltage of the battery reached 4.5 V and then cut-off at a current level at about a rate of 0.01 C while maintaining a constant voltage of about 4.5V. Thereafter, the lithium batteries were discharged at a constant current of 0.1 C until a voltage of the battery reached 2.5 V.

From the second cycle, the lithium batteries of Examples 21-24 and Comparative Example 15 were each charged at a constant current of 0.5 C until a voltage of the battery was 4.6 V and then cut-off at a current level at about a rate of 0.05 C while maintaining a constant voltage of about 4.6 V. Thereafter, the lithium batteries were discharged at a constant current of 1 C until a voltage of the battery was 2.5 V. The charging and discharging process was repeated until the 45$^{th}$ cycle.

Figure 4C:
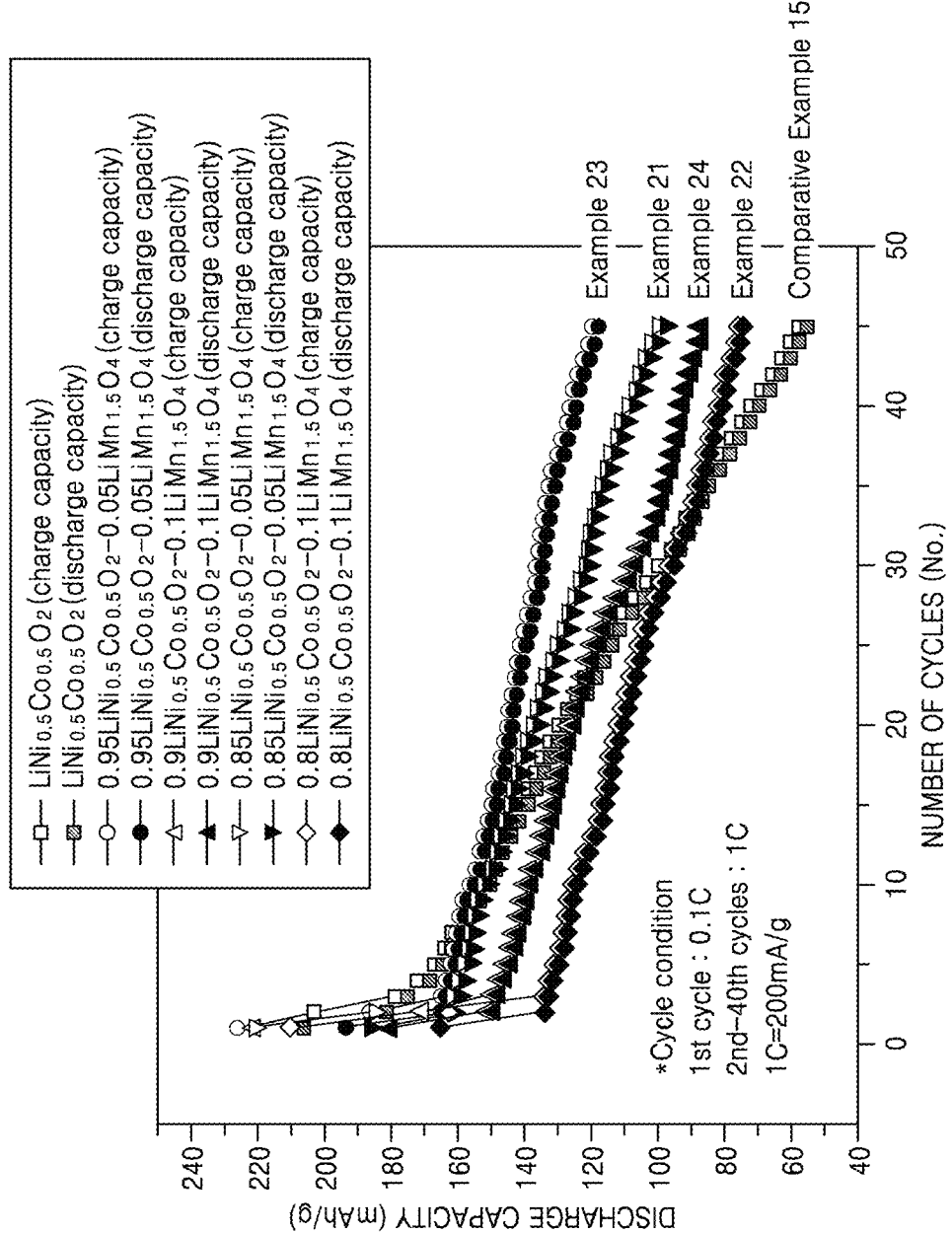
FIG. 4C is a graph of discharge capacity (milliampere-hours per gram, mAh/g) versus number of cycles for lithium batteries prepared in Examples 21 to 24 and Comparative Example 15.
Figure 4D:
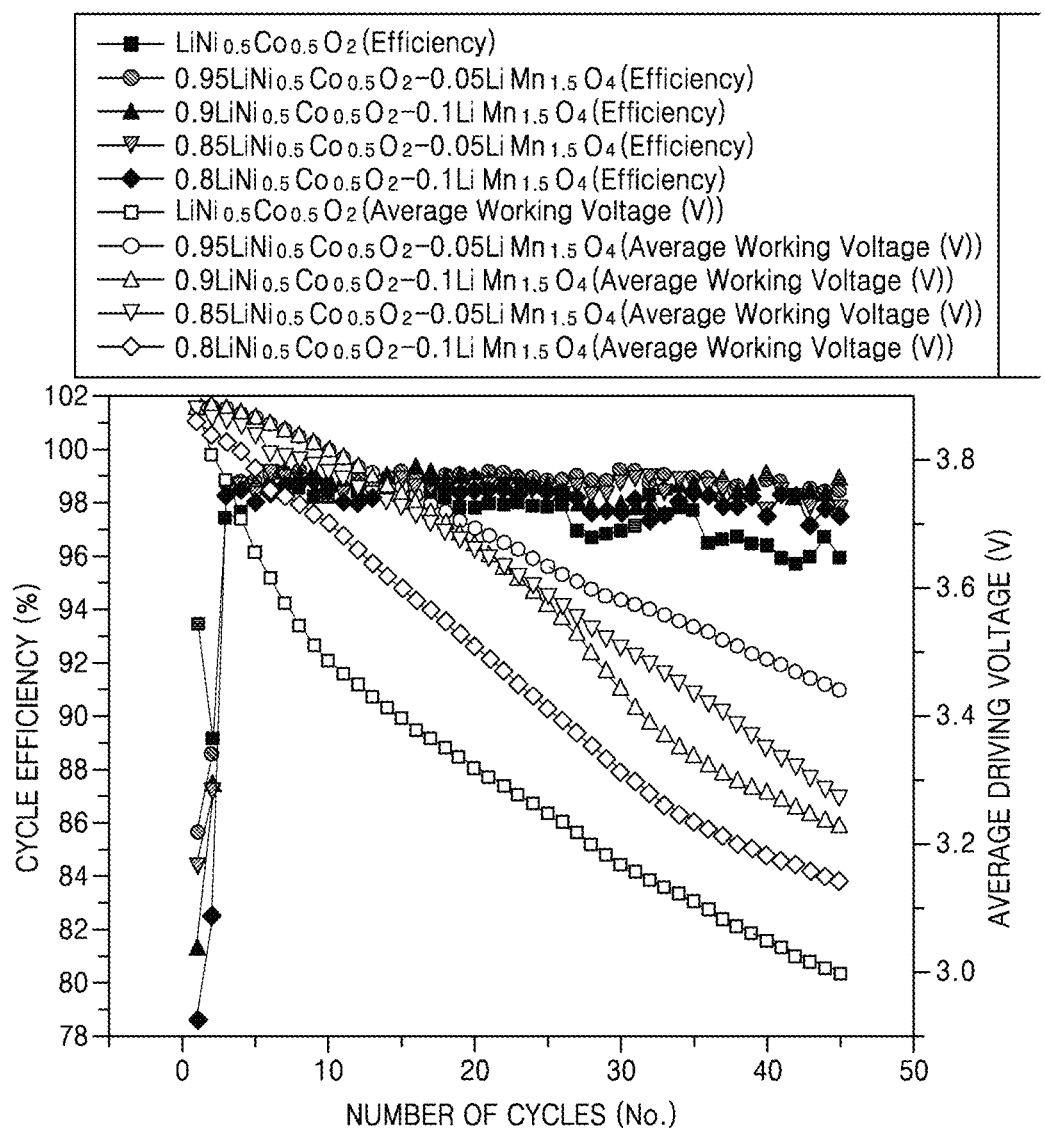
FIG. 4D is a graph of cell efficiency (percent) versus number of cycles for lithium batteries prepared in Examples 21 to 24 and Comparative Example 15.

A discharge capacity change according to the number of cycles in each of the lithium batteries is shown in FIG. 4C. Also, a cycle efficiency and an average driving voltage according to the number of cycles are shown in FIG. 4D. The results illustrated from the top to the bottom of FIGS. 4C and 4D correspond to Comparative Example 15, Example 23, Example 21, Example 24, and Example 22, respectively.

A capacity retention and a discharge voltage decay of the lithium battery are calculated according to Equations 2 and 3, and an initial cycle efficiency is calculated according to Equation 4. The results are shown in Table 3.

Initial efficiency (1$^{st}$ cycle efficiency)=[(1$^{st}$ cycle discharge capacity)/(1$^{st}$ cycle charge capacity)]× 100%      Equation 4

Also, an average driving voltage retention is calculated according to Equation 5, and the results are shown in Table 3.

Average driving voltage retention=[(40$^{th}$ cycle average driving voltage)/(1$^{st}$ cycle average driving voltage)]×100%      Equation 5

TABLE 3

| | Initial cycle efficiency (%) | Capacity retention (%) | Average working voltage retention (%) |
|---|---|---|---|
| Comparative Example 14 | 93 | 33.7 | — |
| Example 21 | 81 | 51.1 | 59 |
| Example 22 | 79 | 80 | 68 |
| Example 23 | 86 | 124 | 38 |
| Example 24 | 84 | 106 | 52 |

As shown in Table 3 and FIGS. 4C and 4D, a 1$^{st}$ cycle efficiency of the lithium battery of Comparative Example 15 was relatively greater than those of the lithium batteries prepared in Examples 21 to 24. However, the lithium batteries of Examples 21 to 24 had a significantly improved capacity retention compared to that of the lithium battery of Comparative Example 15. Also, the lithium batteries of Examples 21 to 24 had improved average driving voltage retention characteristics.

Evaluation Example 3: Charging/Discharging Profile

1) Example 13 and Comparative Example 10

Figure 5A:
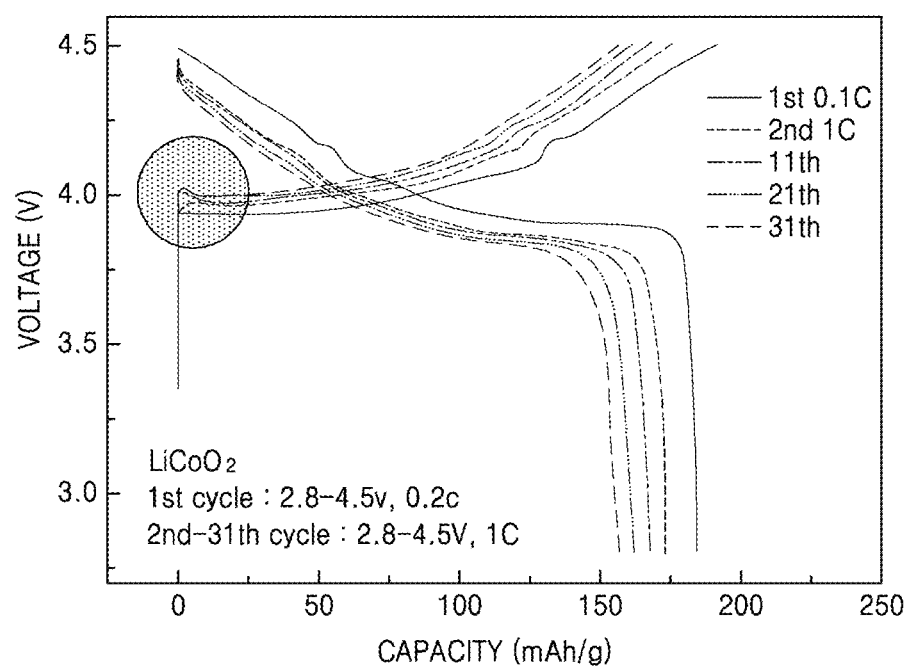
FIGS. 5A and 5B are each a graph of voltage (volts) versus capacity (milliampere hours per gram, mAh/g) and show charging/discharging profiles of the lithium batteries prepared in Comparative Example 10 and Example 13, respectively.
Figure 5B:
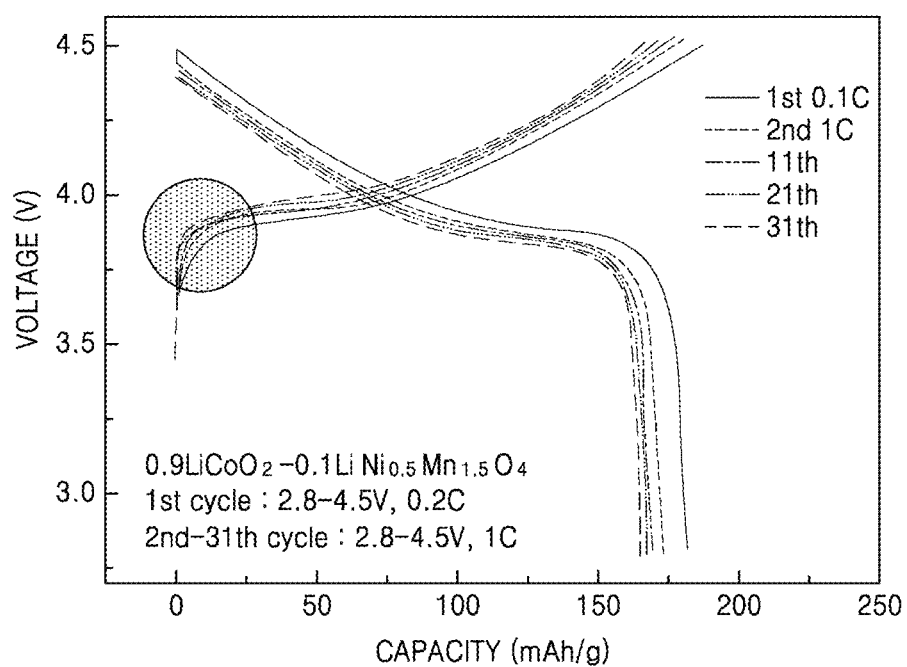
Figure 5C:
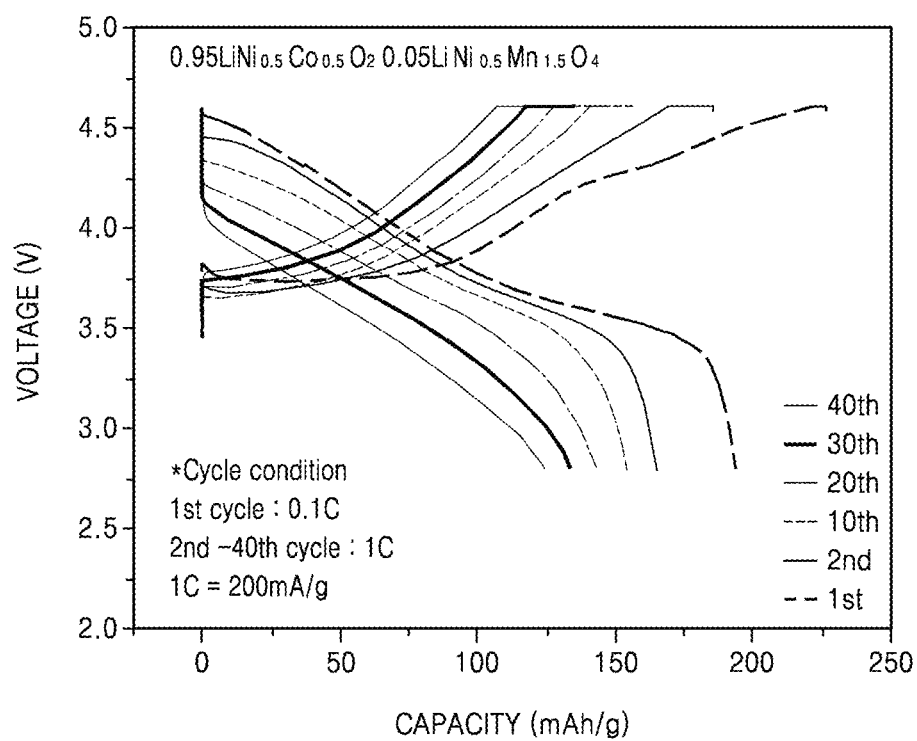
FIGS. 5C through 5G are each a graph of voltage (volts) versus capacity (milliampere hours per gram, mAh/g) and show charging/discharging profiles of lithium batteries prepared in Examples 14, 21, 22, and 24 and Comparative Example 15, respectively.
Figure 5D:
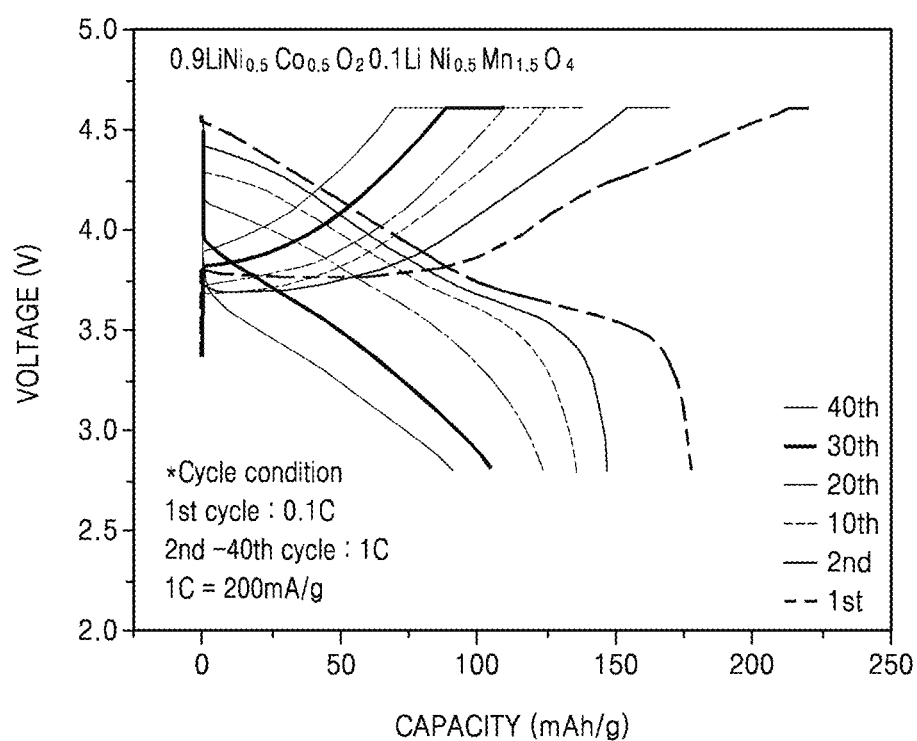
Figure 5E:
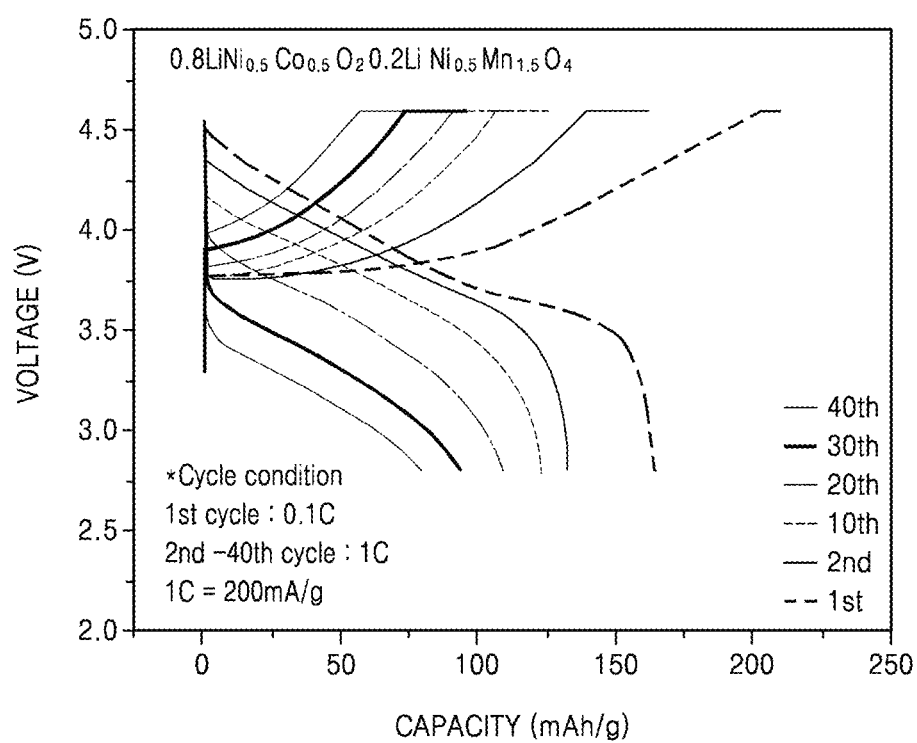
Figure 5F:
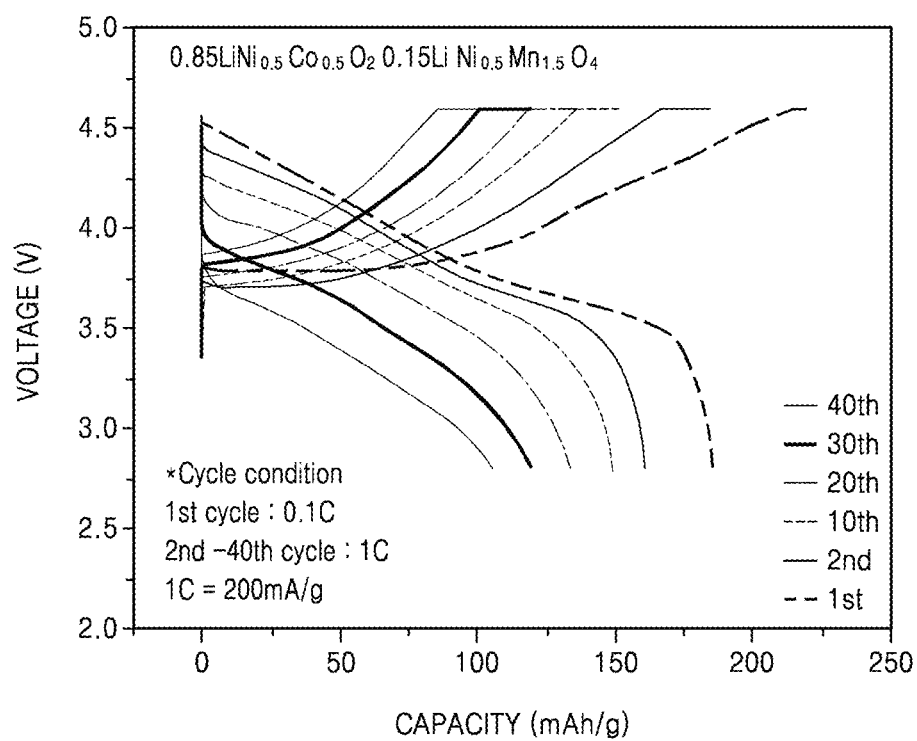
Figure 5G:
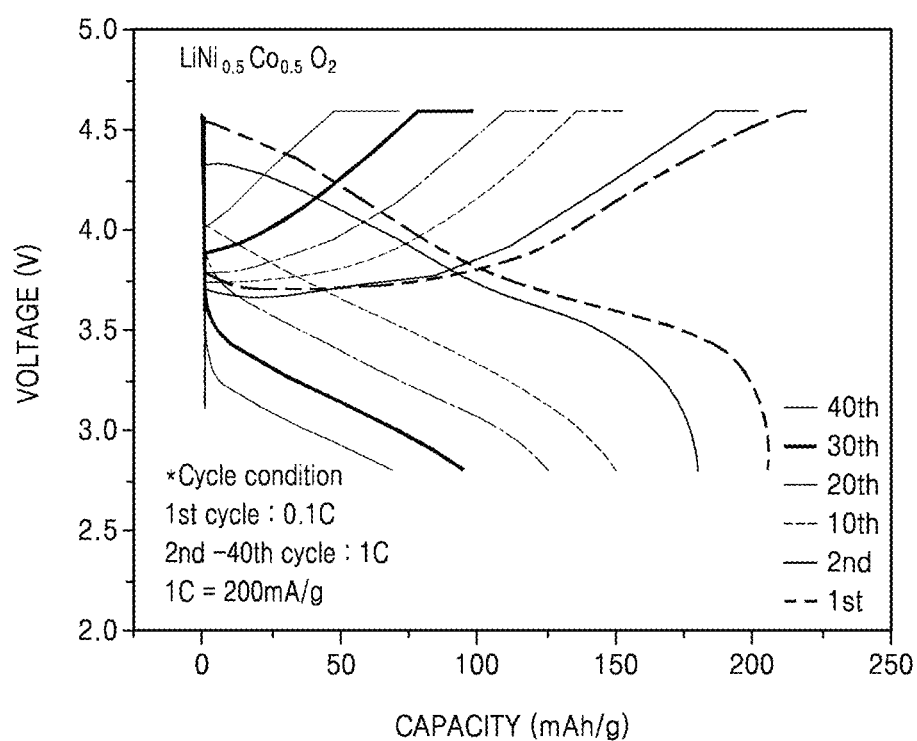

Charging/discharging profiles of the lithium batteries prepared in Comparative Example 10 and Example 13 are evaluated, and the results are shown in FIGS. 5A and 5B, respectively.

In the first cycle, the lithium batteries of Example 13 and Comparative Example 10 were each charged at a constant current of 0.2 C until a voltage of the battery reached 4.5 V and then cut-off at a current level at about a rate of 0.01 C while maintaining a constant voltage of about 4.5V. Thereafter, the lithium batteries were discharged at a constant current of 0.2 C until a voltage of the battery reached 2.8 V.

From the second cycle, the lithium batteries of Example 13 and Comparative Example 10 were each charged at a constant current of 0.5 C until a voltage of the battery was 4.5 V and then cut-off at a current level at about a rate of 0.1 C while maintaining a constant voltage of about 4.5 V. Thereafter, the lithium batteries were discharged at a constant current of 1 C until a voltage of the battery was 2.8 V. The charging and discharging process was repeated until the 31$^{th}$ cycle. In this regard, it may be confirmed that the lithium battery of Example 13 had a high initial capacity, less capacity reduction with an increased number of cycles, and even profiles without a steep voltage decay within a voltage range of 2.8 V to 4.5 V compared to those of the lithium battery prepared in Comparative Example 10.

2) Examples 14, 21, 22, and 24 and Comparative Example 15

Charging/discharging profiles of the lithium batteries prepared in Examples 14, 21, 22, and 24 and Comparative Example 15 are evaluated, and the results are shown in FIGS. 5C through 5G, respectively.

In the first cycle, the lithium batteries prepared in Examples 14, 21, 22, and 24 and Comparative Example 15 were each charged at a constant current of 0.1 C until a voltage of the battery reached 4.5 V and then cut-off at a current level at about a rate of 0.01 C while maintaining a constant voltage of about 4.5V. Thereafter, the lithium batteries were discharged at a constant current of 0.1 C until a voltage of the battery reached 2.8 V.

From the second cycle, the lithium batteries prepared in Examples 14, 21, 22, and 24 and Comparative Example 15 were each charged at a constant current of 0.5 C until a voltage of the battery was 4.5 V and then cut-off at a current level at about a rate of 0.05 C while maintaining a constant voltage of about 4.5 V. Thereafter, the lithium batteries were discharged at a constant current of 1 C until a voltage of the battery was 2.8 V. The charging and discharging process was repeated until the 40$^{th}$ cycle.

In this regard, it may be confirmed that the lithium battery of Examples 14, 21, 22, and 24 had a high initial capacity, less capacity reduction with an increased number of cycles, and even profiles without a steep voltage decay within a voltage range of 2.8 V to 4.5 V compared to those of the lithium battery prepared in Comparative Example 15. Such characteristics may be found from the lithium battery of Examples 14, 21, 22, and 24 because a spinel phase having 3-dimensional crystalline structure is embedded in a layered structure, and thus the composite positive electrode active material of the lithium battery of Examples 14, 21, 22, and 24 are structurally stabilized.

Evaluation Example 4: Charging/Discharging Test and XRD Analysis

The first charging/discharging cycle was performed on the lithium batteries prepared in Example 13 and Comparative Examples 10, 13, and 14 at 25° C. The lithium batteries were each CC charged at a constant current of 0.1 C until a voltage of the battery was 4.7 V, and then discharged at a constant current of 0.1 C until a voltage of the battery was 2.5 V.

Figure 7:
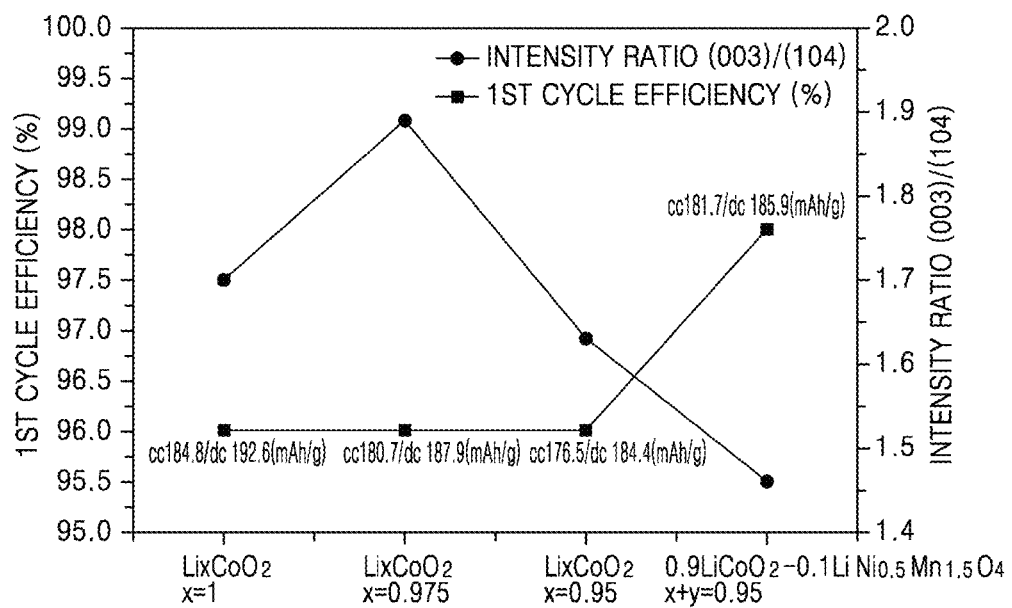
FIG. 7 illustrates $1^{st}$ cycle charging/discharging efficiency of the lithium batteries prepared in Example 13 and Comparative Examples 10, 13, and 14.

The first cycle charging/discharging efficiency of the lithium battery was evaluated, and the results are shown in FIG. 7. In FIG. 7, $0.9LiCoO_2$-$0.1LiNi_{0.5}Ni_{0.25}Mn_{0.75}O_2$ corresponds to Example 13, and $LiCoO_2$, $Li_{0.975}CoO_2$, and $Li_{0.95}CoO_2$ correspond to Comparative Examples 10, 14, and 13, respectively.

X-ray diffraction analysis was performed on the positive electrode active material prepared in Example 1, Comparative Example 2, Comparative Example 5, and Comparative Example 6 that were used in the lithium battery prepared in Example 13 and Comparative Example 10, 13, and 14, and thus an intensity ratio of the peak corresponding to the (003)/(104) face was evaluated. The results are shown in FIG. 7.

As shown in FIG. 7, the lithium battery of Example 13 had improved initial cycle efficiency. Also, the composite positive electrode active material of Example 1 used in the lithium battery prepared in Example 13 had a decreased intensity ratio of the peak corresponding to the (003)/(104) face compared to that of lithium cobalt oxide (LCO). The results show that a cationic mixing of the composite positive electrode active material in the lithium battery of Example 13 is high. A high amount of the cation mixing indicates that a large amount of a transition metal exists in a lithium layer. In this regard, it may be known that in spite of having a high cation mixing, an initial cycle efficiency of the lithium battery of Example 13 improved. Thus, since in the composite positive electrode active material, $LiNi_{0.5}Mn_{1.5}O_4$ having a spinel structure, forms a composite by intermixing $LiCoO_2$ having a layered structure, and a transition metal existed in a lithium layer, a structure of the composite positive electrode active material was stabilized, and thus it may be confirmed that an initial cycle efficiency improved.

Evaluation Example 5: Charging/Discharging Test

Figure 8:
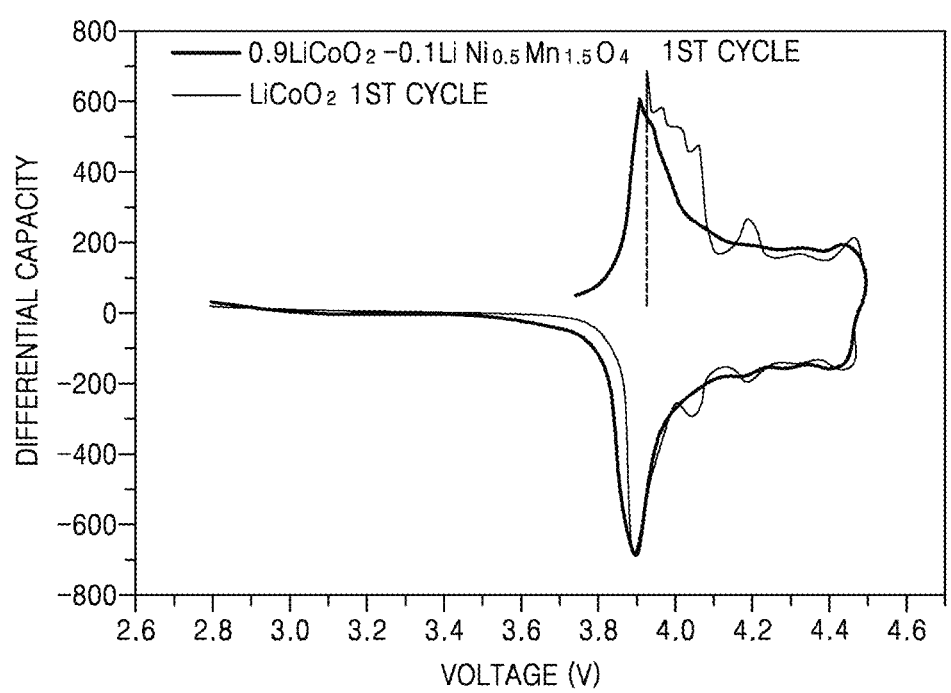
FIG. 8 is a graph of differential capacity (dQ/dV) versus voltage (volts) and illustrates $1^{st}$ cycle differentiated charging/discharging characteristics of the lithium batteries prepared in Example 13 and Comparative Example 10.

Differential capacity (dQ/dV) of the lithium batteries prepared in Example 13 and Comparative Example 10 in the first cycle were evaluated, and the results are shown in FIG. 8. In FIG. 8, $LiCoO_2$ corresponds to Comparative Example 16, and $0.9LiCoO_2$-$0.11LiNi_{0.5}Mn_{1.5}O_4$ corresponds to Example 13.

The lithium battery prepared in Comparative Example 10 had many oxidation reduction peaks within a voltage range of about 3.9 V to about 4.5 V as shown in FIG. 8. In this regard, it may be known that a structure transition occurs at a voltage of 4.3 V or higher in the lithium battery of Comparative Example 10.

On the contrary, in an oxidation reduction curve, the first cycle differential capacity (dQ/dV) of the lithium battery prepared in Example 13 had a smooth oxidation reduction peak within a voltage range of about 3.9 V to about 4.5 V compared to that of the lithium battery prepared in Comparative Example 10

Evaluation Example 6: Charging/Discharging Profiles

1) Examples 13 to 20 and Comparative Examples 10 and 11

Charging/discharging profiles of the lithium batteries prepared in Examples 13 to 20 and Comparative Examples 10 and 11 were evaluated, and the results are shown in FIGS. 6A through 6J, respectively.

In the first cycle, the lithium batteries of Examples 13 to 20 and Comparative Examples 10 and 11 were each charged at a constant current of 0.2 C until a voltage of the battery reached 4.6 V and then cut-off at a current level at about a rate of 0.01 C while maintaining a constant voltage of about 4.6V. Thereafter, the lithium batteries were discharged at a constant current of 0.1 C until a voltage of the battery reached 2.8 V.

From the second cycle, the lithium batteries of Examples 13 to 20 and Comparative Examples 10 and 11 were each charged at a constant current of 0.2 C until a voltage of the battery was 4.6 V and then cut-off at a current level at about a rate of 0.01 C while maintaining a constant voltage of about 4.6 V. Thereafter, the lithium batteries were discharged at a constant current of 0.2 C until a voltage of the battery was 2.8 V. The charging and discharging process was repeated until the $41^{th}$ cycle.

In this regard, it may be confirmed that the lithium battery of Examples 13 to 20 had a high initial capacity, less capacity reduction with an increased number of cycles, and even profiles without a steep voltage decay within a voltage range of 2.8 V to 4.6 V compared to those of the lithium batteries prepared in Comparative Examples 10 and 11.

Evaluation Example 7: $1^{st}$ Discharging Characteristics

Discharging of the lithium batteries prepared in Examples 13 to 20 and Comparative Examples 10 and 11 were performed by discharging each of the batteries at a constant current of 0.2 C until a voltage was 2.5 V. Then, the battery was charged at 0.5 C/4.6 V CC/CV and charged until a current was 1 C.

Figure 6A:
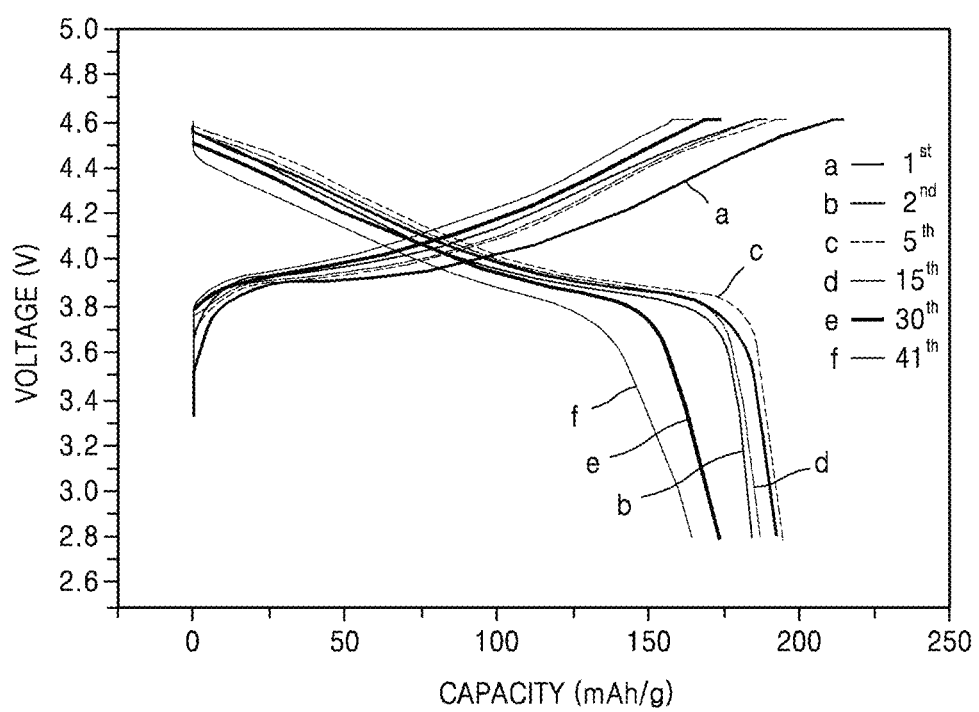
FIGS. 6A through 6J are each a graph of voltage (volts) versus capacity (milliampere hours per gram, mAh/g) and show charging/discharging profiles of lithium batteries prepared in Examples 13 to 20 and Comparative Examples 10 and 11, respectively.
Figure 6B:
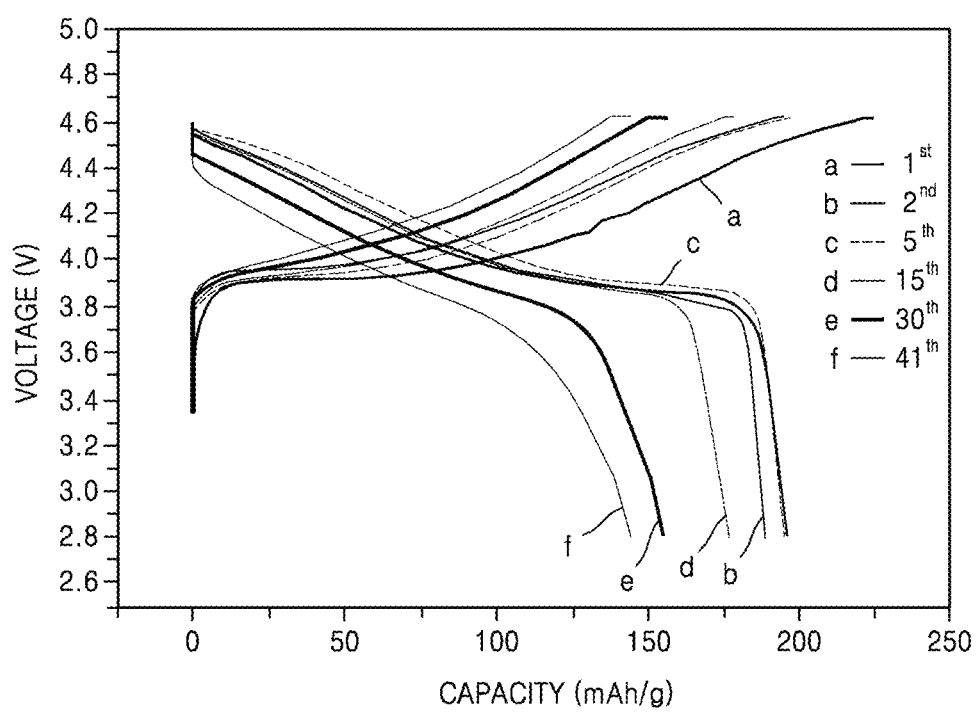
Figure 6C:
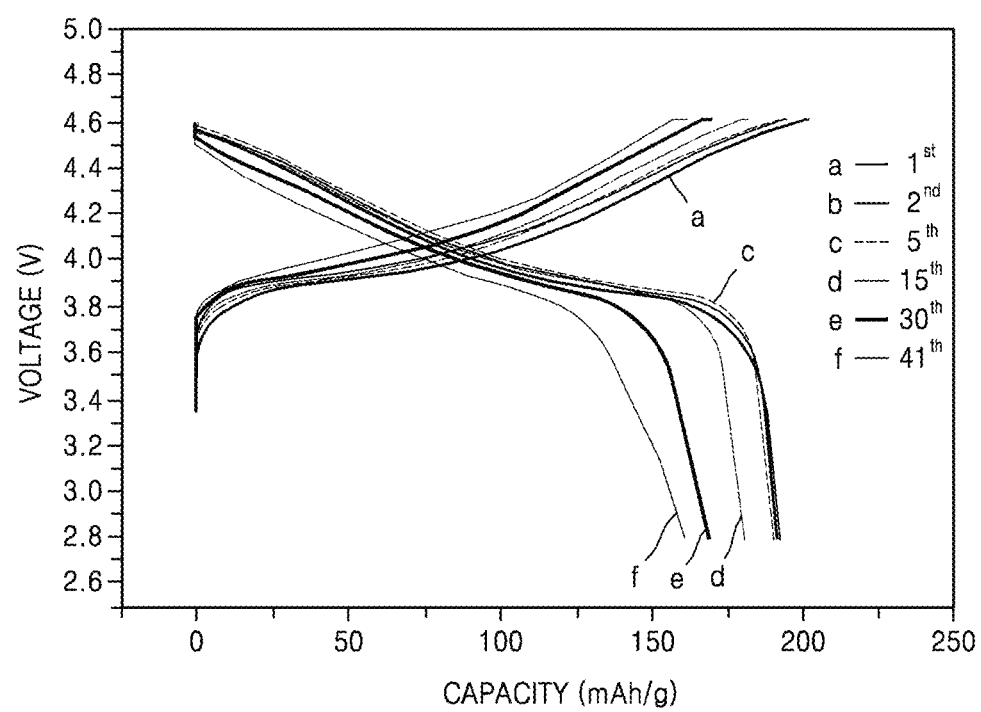
Figure 6D:
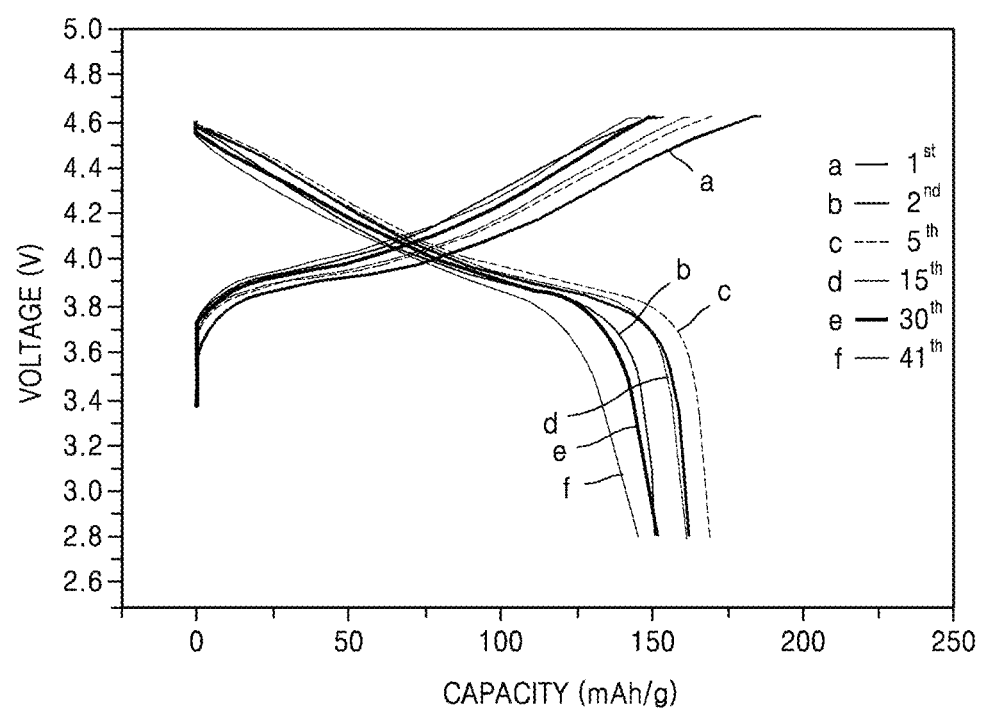
Figure 6E:
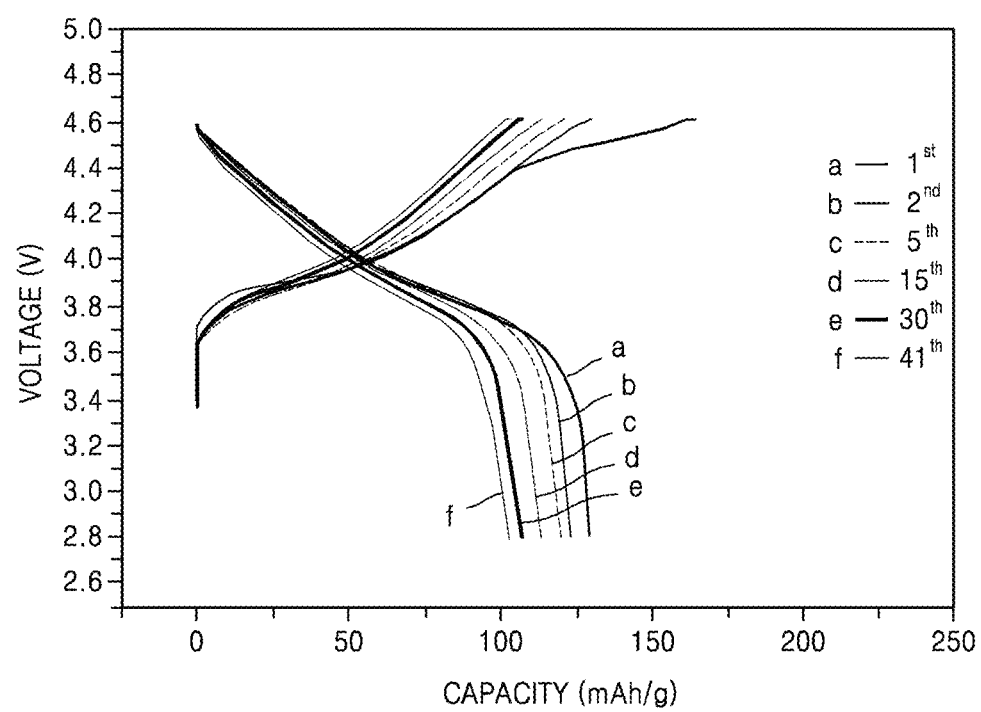
Figure 6F:
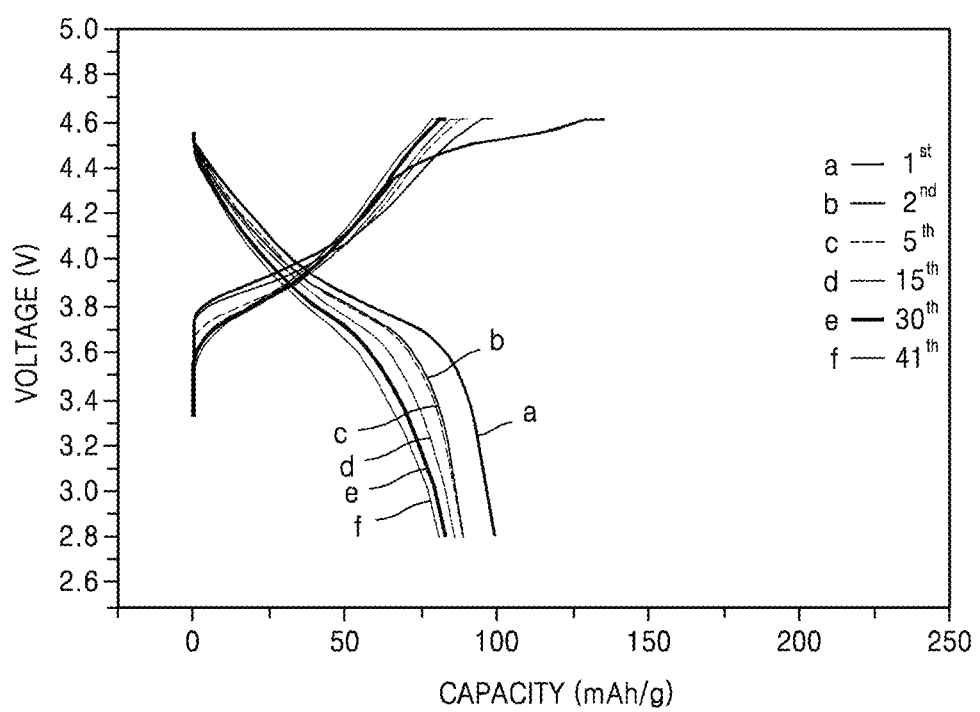
Figure 6G:
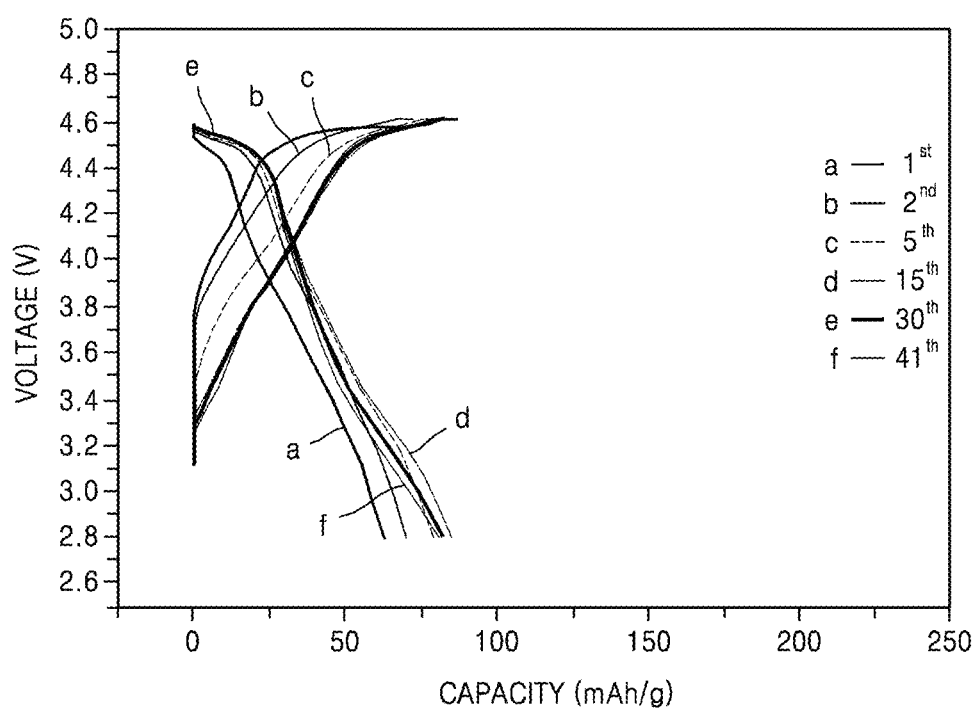
Figure 6H:
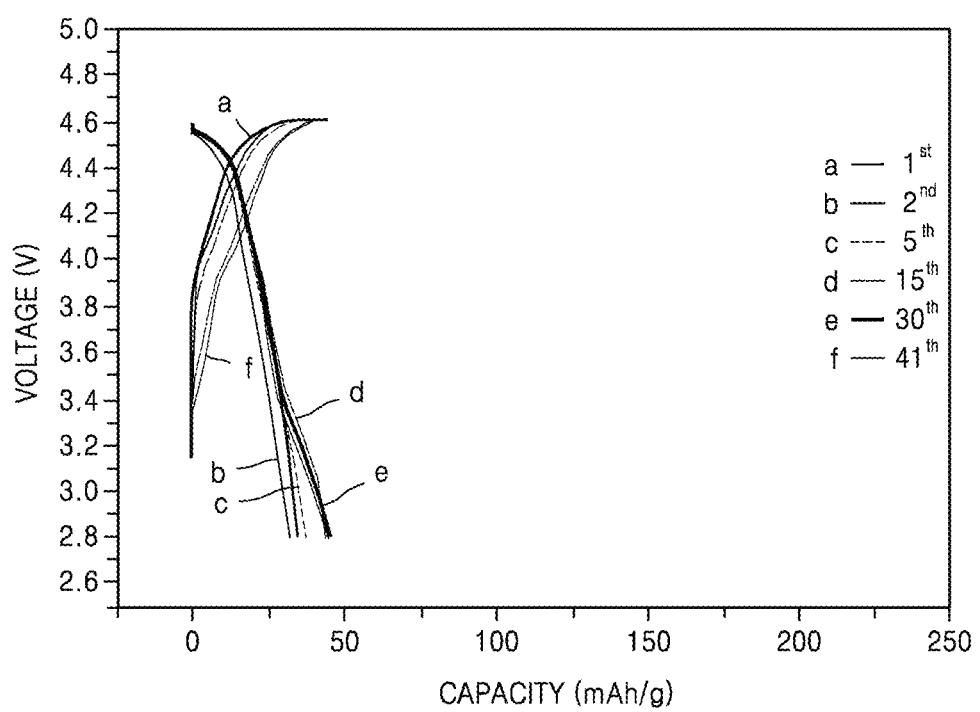
Figure 6I:
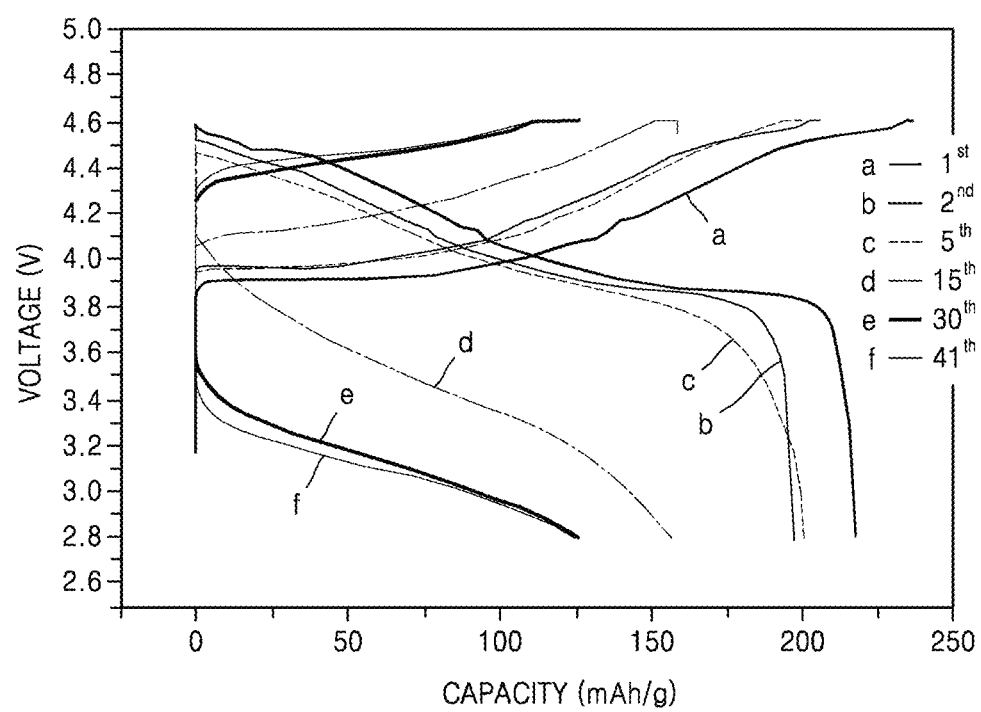
Figure 6J:
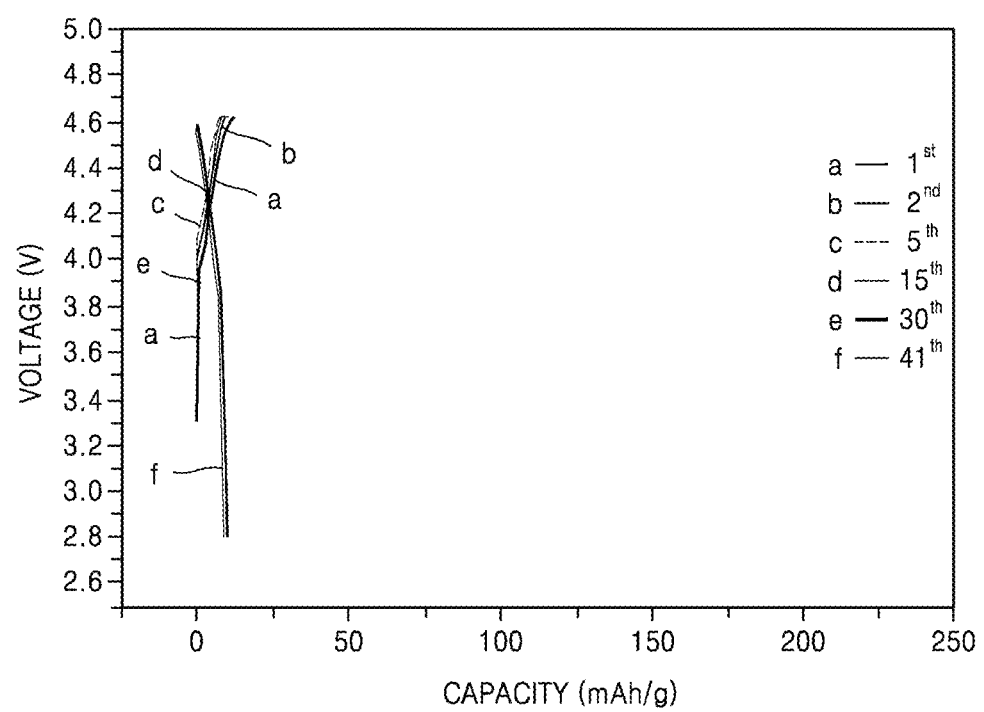
Figure 6K:
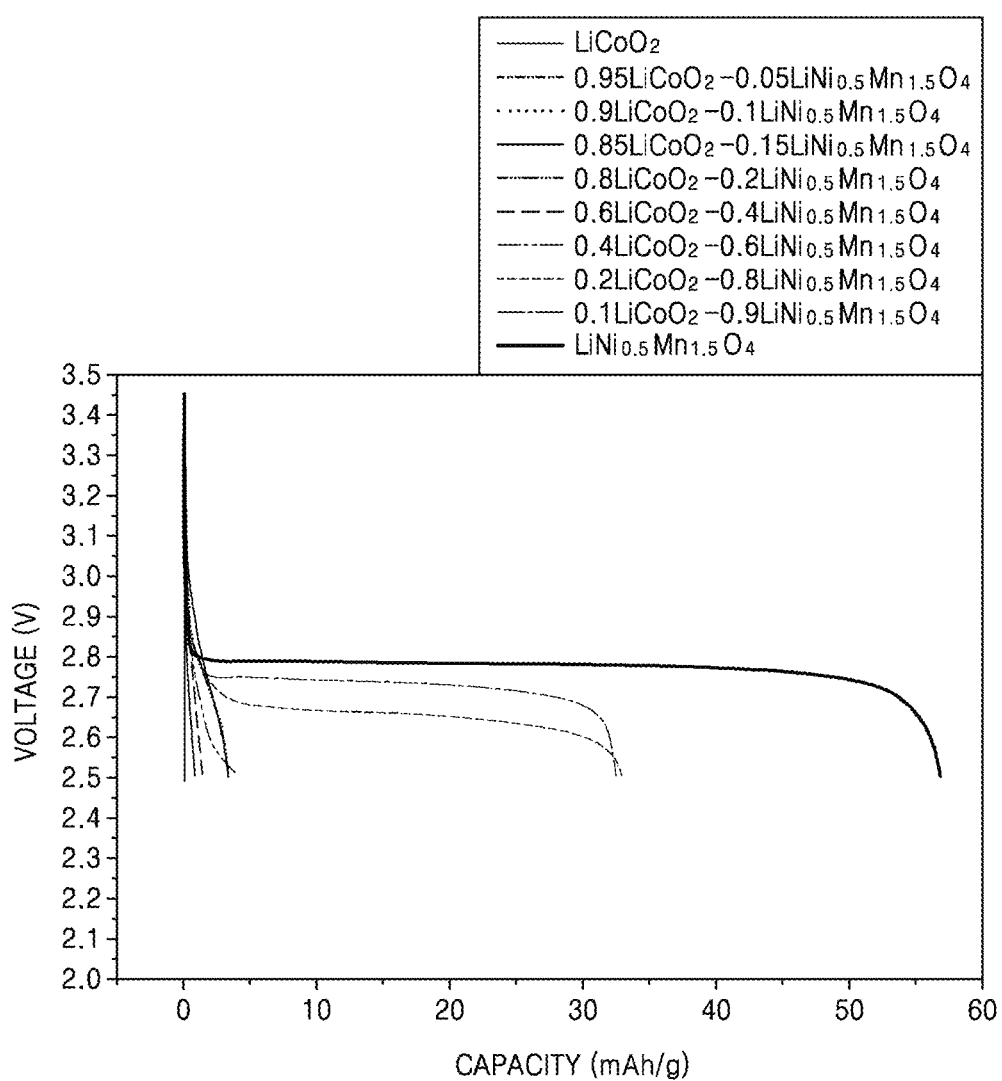
FIG. 6K illustrates primary discharge characteristics of the lithium batteries prepared in Examples 13 to 20 and Comparative Examples 10 and 11.

The charging/discharging characteristics of the lithium battery are shown in FIG. 6K. In FIG. 6K, $LiCoO_2$, $0.95LiCoO_2$.$0.05LiNi_{0.5}Mn_{1.5}O_4$, $0.9LiCoO_2$.$0.1LiNi_{0.5}Mn_{1.5}O_4$, $0.85LiCoO_2$.$0.15LiNi_{0.5}Mn_{1.5}O_4$, $0.8LiCoO_2$.$0.2LiNi_{0.5}Mn_{1.5}O_4$, $0.6LiCoO_2$.$0.4LiNi_{0.5}Mn_{1.5}O_4$, $0.4LiCoO_2$.$0.6LiNi_{0.5}Mn_{1.5}O_4$, $0.2LiCoO_2$.$0.8LiNi_{0.5}Mn_{1.5}O_4$, $0.1LiCoO_2$.$0.9LiNi_{0.5}Mn_{1.5}O_4$, and $LiNi_{0.5}Mn_{1.5}O_4$ correspond to Comparative Example 10, Examples 14, 13, 15, 16, 17, 18, 19, and 20, and Comparative Example 11, respectively.

Referring to FIG. 6K, the lithium batteries prepared in Examples 13 to 20 have improved $1^{st}$ discharge capacity characteristics, and when an amount of a compound having a spinel phase increased, the $1^{st}$ discharge capacity of the lithium batteries increased.

In the compound having a spinel phase, a redox reaction occurred at an octahedral site within a voltage range of about 2.6 V to about 2.9 V. In this regard, it may be confirmed that the composite positive electrode active material used in the lithium batteries prepared in Examples 13 to 20 had a structure in which the spinel phase is intermixed.

Evaluation Example 8: Scanning Electron Microscopy

Figure 9:
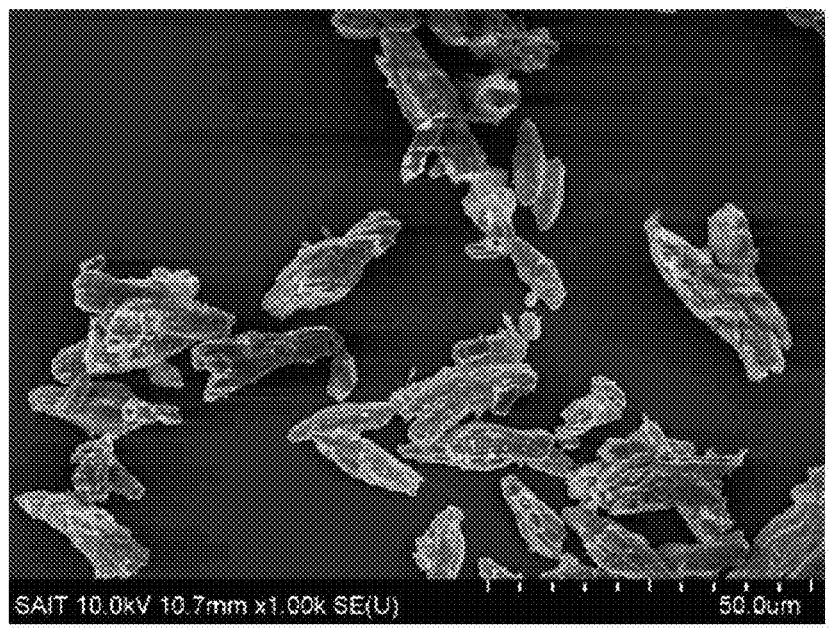
FIG. 9 is a scanning electron microscope (SEM) image of the composite positive electrode active material prepared in Example 1.

The composite positive electrode active material prepared in Example 1 was analyzed using a scanning electron microscope, and the results are shown in FIG. 9.

Evaluation Example 9: Charging/Discharging Characteristics

1) Examples 13 to 20 and Comparative Examples 10 and 11

First and second charging/discharging and cycle charging/discharging were performed on the lithium batteries prepared in Examples 13 to 20 and Comparative Examples 10 and 11 at 25° C.

In the first cycle, the lithium batteries of Examples 13 to 20 and Comparative Examples 10 and 11 were each charged at a constant current of 0.2 C until a voltage of the battery reached 4.6 V and then cut-off at a current level at about a rate of 0.01 C while maintaining a constant voltage of about 4.6V. Thereafter, the lithium batteries were discharged at a constant current of 0.1 C until a voltage of the battery reached 2.8 V.

From the second cycle, the lithium batteries of Examples 13 to 20 and Comparative Examples 10 and 11 were each charged at a constant current of 0.2 C until a voltage of the battery was 4.6 V and then cut-off at a current level at about a rate of 0.01 C while maintaining a constant voltage of about 4.6 V. Thereafter, the lithium batteries were discharged at a constant current of 0.2 C until a voltage of the battery was 2.8 V. The charging and discharging process was repeated until the 42$^{th}$ cycle.

Figure 10:
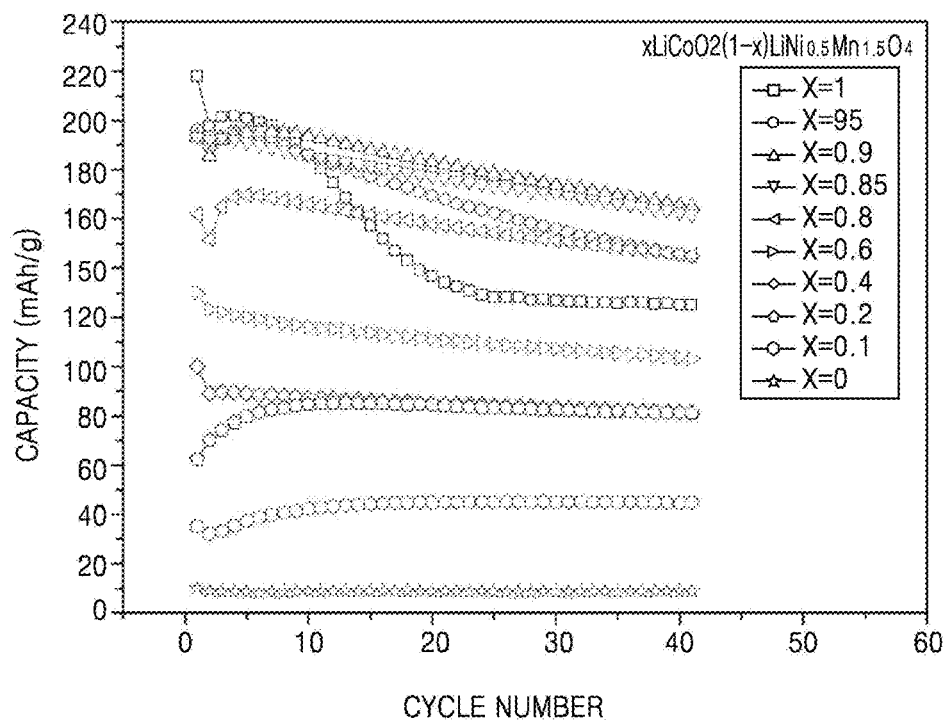
FIG. 10 is a graph of capacity (milliampere-hours per gram, mAh/g) versus cycle number and shows a change in capacity according to the number of cycles with respect to the lithium batteries prepared in Examples 13 to 20 and Comparative Examples 10 and 11.
Figure 11:
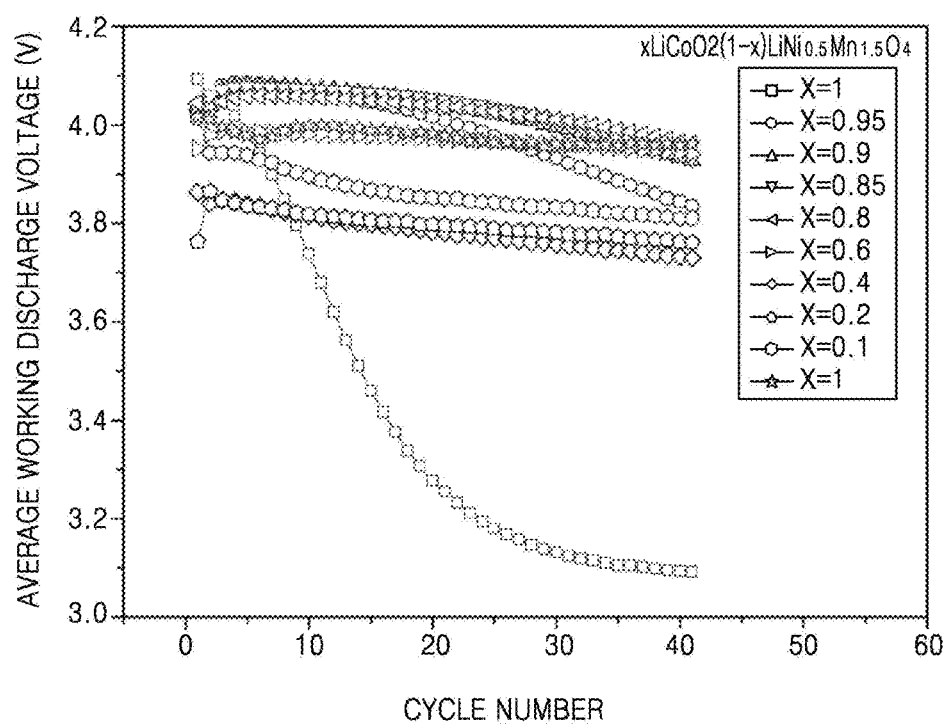
FIG. 11 is a graph of average discharge voltage (volts) versus cycle number and shows a change in average discharge voltage according to the number of cycles with respect to the lithium batteries prepared in Examples 13 to 20 and Comparative Examples 10 and 11.

A discharge capacity change according to the number of cycles in each of the lithium batteries of Examples 13 to 20 and Comparative Examples 10 and 11 is shown in FIG. 10. Also, a change in average discharge voltage according to the number of cycles is shown in FIG. 11. In FIGS. 10 and 11, each case when x is 1, 0.95, 0.9, 0.85, 0.8, 0.6, 0.4, 0.2, 0.1, and 0 corresponds to Comparative Example 10, Examples 14, 13, 15, 16, 17, 18, 19, and 20, and Comparative Example 11, respectively.

Referring to FIG. 10, the lithium batteries prepared in Examples 13 to 20 had increased initial charging/discharging efficiency and improved cycle characteristics compared to those of the lithium battery prepared in Comparative Example 11. Also, as shown in FIG. 11, the lithium batteries prepared in Examples 13 to 20 had a reduced discharge voltage decay (average working voltage retention) and improved capacity retention characteristics compared to those of the lithium battery prepared in Comparative Example 10.

As described above, according to the above embodiments, a composite positive electrode active material has improved structural stability during high-voltage charging. When a positive electrode including the composite positive electrode active material is used, a lithium battery with reduced voltage drop and improved lifespan characteristics even after repeated charging/discharging may be manufactured.

It should be understood that embodiments described herein should be considered in a descriptive sense only and not for purposes of limitation. Descriptions of features, aspects, or advantages within each embodiment should be considered as available for other similar features, aspects, or advantages in other embodiments.

While an embodiment have been described with reference to the figures, it will be understood by those of ordinary skill in the art that various changes in form and details may be made therein without departing from the spirit and scope as defined by the following claims.

What is claimed is:

1. A composite positive electrode active material comprising:
   an integrated crystal structure formed of a lithium compound and a co-precipitation product of a Co precursor, a Mn precursor, and a Ni precursor, wherein the lithium compound and the co-precipitation product form a lithium layer disposed between layers of a first lithium oxide,
   wherein the first lithium oxide has the formula $LiCoO_2$ and has a layered structure;
   wherein the lithium layer comprises a second lithium oxide of the formula $Li(Ni_{1-c}Mn_c)_2O_4$, wherein $0.2<c<1$ and having a spinel structure,
   wherein the first metal oxide and the second metal oxide form the integrated crystal structure,
   wherein a content of Mn and Ni in the lithium layer is greater than 0 and less than about 10%, based a total content of a lithium site in the lithium layer of the composite positive electrode active material,
   wherein the composite positive electrode active material has a molar ratio of Li/(Co+(Ni+Mn)) of 0.8 to less than 1, and
   wherein the composite positive electrode active material has a structure in which the second lithium oxide of the formula $Li(Ni_{1-c}Mn_c)_2O_4$ having the spinel structure is disposed between layers of the first lithium oxide of the formula $LiCoO_2$ having the layered structure.

2. The composite positive electrode active material of claim 1, wherein the composite positive electrode active material comprises a compound represented by Formula 3:

$$xLiMO_2 \cdot yLiMe_2O_4 \qquad \text{Formula 3}$$

wherein, in Formula 3 $x+y=1$, $0<x<1$, $0<y<1$, and $0.2<c<1$, and
a molar ratio of Li/(Co+(Ni+Mn)) in the composite is less than 1.

3. The composite positive electrode active material of claim 2, wherein, in Formula 3, x is in a range of about 0.75 to about 0.99; and y is in a range of about 0.01 to about 0.25.

4. The composite positive electrode active material of claim 2, wherein the compound represented by Formula 3 is $xLiCoO_2 \cdot yLiNi_{0.5}Mn_{1.5}O_4$.

5. The composite positive electrode active material of claim 2, wherein the compound represented by Formula 3 is $0.8LiCoO_2 \cdot 0.2LiNi_{0.5}Mn_{1.5}O_4$, $0.9LiCoO_2 \cdot 0.1LiNi_{0.5}Mn_{1.5}O_4$, $0.95LiCoO_2 \cdot 0.05LiNi_{0.5}Mn_{1.5}O_4$, $0.85LiCoO_2 \cdot 0.15LiNi_{0.5}Mn_{1.5}O_4$, or $0.6LiCoO_2 \cdot 0.4LiNi_{0.5}Mn_{1.5}O_4$.

6. The composite positive electrode active material of claim 1, wherein, in Formula 1, a molar ratio of Li/(Co+(Ni+Mn)) is in a range of about 0.8 to about 0.95.

7. The composite positive electrode active material of claim 1, wherein the second metal oxide is $LiNi_{0.5}Mn_{1.5}O_4$.

8. The composite positive electrode active material of claim 1, wherein the content of the Mn, Ni, or a combination thereof in the lithium layer is determined by Equation 1:

$$\text{Cation mixing ratio} = \{I_{(003)}/I_{(104)}\} \times 100 \qquad \text{Equation 1}$$

wherein, $I_{(003)}$ is an intensity of an X-ray diffraction peak of the (003) face of the composite and $I_{(104)}$ is an intensity of an X-ray diffraction peak of the (104) face of the composite, when determined using Cu-kα radiation.

9. The composite positive electrode active material of claim 1, wherein a full width at half maximum of an X-ray diffraction peak within a 2θ range of about 18° to about 19° is in a range of about 0.2° to about 0.28°, when determined using Cu-kα radiation.

10. The composite positive electrode active material of claim 1, wherein an average discharge voltage of a half-cell during a 50$^{th}$ cycle is about 97.5% to about 99.95% of an average discharge voltage during a first cycle, when determined using a positive electrode comprising the composite positive electrode active material and lithium as a counter electrode.

11. The composite positive electrode active material of claim 1, wherein the composite positive electrode active material further comprises a coating layer comprising at least one selected from a conductive material, a metal oxide, and an inorganic fluoride.

12. The composite positive electrode active material of claim 11, wherein the conductive material is at least one selected from a carbon-containing material, indium tin oxide, $RuO_2$, and ZnO.

13. The composite positive electrode active material of claim 11, wherein the metal oxide is at least one selected from silica, alumina, a zirconium oxide, a titanium oxide, and a mixture thereof.

14. The composite positive electrode active material of claim 11, wherein the inorganic fluoride is at least one selected from $AlF_3$, CsF, KF, LiF, NaF, RbF, $TiF_4$, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $BF_3$, $BiF_3$, $CeF_3$, $CrF_3$, $DyF_3$, $EuF_3$, $GaF_3$, $GdF_3$, $Fe_{F3}$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, and $WF_6$.

15. A positive electrode comprising the composite positive electrode active material of claim 1.

16. A lithium battery comprising the positive electrode of claim 15.

17. The lithium battery of claim 16, wherein a working voltage of the lithium battery is between about 2.5 volts to about 4.5 volts.

\* \* \* \* \*